United States Patent [19]

Prokai et al.

[11] 4,058,494

[45] Nov. 15, 1977

[54] POLYETHER URETHANE FOAM PRODUCED WITH CYANO-ETHER POLYSILOXANE-POLYOXYALKYLENE COPOLYMERS

[75] Inventors: Bela Prokai, Mahopac; Bernard Kanner, West Nyack, both of N.Y.

[73] Assignee: Union Carbide Corporation, New York, N.Y.

[21] Appl. No.: 691,021

[22] Filed: May 28, 1976

Related U.S. Application Data

[62] Division of Ser. No. 536,885, Dec. 27, 1974, Pat. No. 3,979,420.

[51] Int. Cl.$^2$ .................... C08G 18/14; C08K 5/54
[52] U.S. Cl. ............................................. 260/2.5 AH
[58] Field of Search ................ 260/448.8 R, 448.2 N, 260/2.5 AH

[56] References Cited

U.S. PATENT DOCUMENTS

| | | | |
|---|---|---|---|
| 3,846,462 | 11/1974 | Prokai et al. | 260/2.5 AH |
| 3,887,500 | 6/1975 | Prokai et al. | 260/2.5 AH |
| 3,905,924 | 9/1975 | Prokai | 260/2.5 AH |
| 3,935,123 | 1/1976 | Prokai et al. | 260/2.5 AH |
| 3,966,650 | 6/1976 | Prokai | 260/2.5 AH |

FOREIGN PATENT DOCUMENTS 803,460   2/1974   Belgium

*Primary Examiner*—C. Warren Ivy
*Attorney, Agent, or Firm*—Marylin Klosty

[57] ABSTRACT

Organosilicone compositions are provided which comprise polysiloxane-polyoxyalkylene copolymers containing monofunctional siloxy units ($M_o$) and, for every two moles of $M_o$, an average of between about 10 and about 200 difunctional dialkylsiloxy units, an average of between about 2 and about 100 silicon-bonded cyano-bearing ether groups (Q) having the formula, —(O)$_q$R'OR"CN, wherein $q$ is zero or one, R' is bivalent alkylene of 3 to 8 carbon atoms and R" is bivalent alkylene of 2 to 4 carbon atoms, and an average of between about 2 and about 30 silicon-bonded, organic-capped polyoxyalkylene blocks (E), the polyoxyalkylene content of said copolymers being constituted of between about 20 and about 65 weight percent of oxyethylene units, said $M_o$ units having at least two alkyls bonded to the respective silicon atoms thereof, the remaining organic group of $M_o$ being alkyl, Q or E, said copolymers also containing difunctional monoalkylsiloxy units the remaining organic group bonded to the respective silicon atoms thereof being Q or E. The polymers of the invention are effective stabilizers of flexible polyether polyol-based polyurethane foam and offer particular advantage in the formation of flame-retarded foam.

5 Claims, No Drawings

POLYETHER URETHANE FOAM PRODUCED WITH CYANO-ETHER POLYSILOXANE-POLYOXYALKYLENE COPOLYMERS

This is a division of application Ser. No. 536,885, filed Dec. 27, 1974, now U.S. Pat. No. 3,979,420, granted Sept. 7, 1976.

BACKGROUND OF THE INVENTION

The present invention relates to novel organosilicone polymers and their use in the manufacture of urethane cellular products, particularly flame-retarded flexible polyether polyol-based urethane foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

It is also well known that suitable active hydrogen-containing compounds include polyether polyols and polyester polyols. From the standpoint of their chemical structure, therefore, urethanes are usually classified as polyether and polyester urethanes, respectively. Urethane foams also differ with respect to their physical structure and, from this standpoint, are generally classified as flexible, semiflexible or rigid foams.

Although certain techniques of urethane manufacture such as the "one-shot process" and certain components of the foam formulation such as the polyisocyanates, amine catalyst and blowing agent, are generally useful, a specific problem associated with the production of a particular type of urethane foam and the solution thereto are often peculiar to the chemical and physical structure of the desired foamed product. In particular, the efficacy of the foam stabilizer is usually selective with respect to the formation of a particular type of foam. One factor to be considered in the evaluation of stabilizing efficacy is surfactant potency which is reflected by two types of measurements. One is the measured original height to which the foam rises as it is being formed. From this standpoint, the greater the foam rise, the more potent is the surfactant. The second potency measurement is concerned with the ability of the surfactant to maintain the original height of the foam once it has formed. Foams produced with surfactants which have good potency in this second respect undergo a minimum of settling or "top collapse" which may otherwise contribute to split formation and other foam defects.

The search for improved surfactants for stabilization of polyurethane foams is further complicated by the tendency of such foams to ignite readily and burn and the need to reduce their flammability. This characteristic is particularly ojectionable in the case of flexible polyurethane foams in view of the use of such foams in many applications where fire is especially hazardous such as their use in automotive seat cushions and household furniture cushioning. One approach to reducing flammability of flexible foams is to include a flame-retarding agent such as various phosphorus and/or halogen-containing compounds as a component of the foam-producing reaction mixture. It is found, however, that surfactants which may otherwise be effective stabilizers of non flame-retarded as well as flame-retarded foam, may be deficient as stabilizers of flame-retarded foam in that they appear to have an adverse effect on the efficiency of the flame-retardant.

Among the various types of surfactants which have been used to advantage for stabilization of non flame-retarded flexible polyether-based urethane foams are polyoxyalkylene-polysiloxane block copolymers wherein silicon of the siloxane backbone is bonded only to methyl groups and the polyether portion of the polyoxyalkylene blocks is composed of oxyethylene and oxypropylene units. Such copolymers include those of both the hydrolyzable and non hydrolyzable types, that is, copolymers in which the polysiloxane and polyoxyalkylene blocks are linked through —Si—O—C— and —Si—C— bonds, respectively. From the standpoint of possessing a particularly good combination of potency and processing latitude in the stabilization of flexible polyether urethane foams, an especially useful class of non hydrolyzable block copolymers are those described in Reissue Patent No. 27,541. When used to stabilize polyether-based foams derived from reaction mixtures containing a flame-retardant, however, copolymers wherein the polysiloxane blocks are substituted only with methyl groups including copolymers of the hydrolyzable type, generally provide foams which either do not qualify as self-extinguishing by flammability test ASTM D-1692-68), or, if so qualified, the burning extent of the foam is at a relatively high level, leaving room for further improvement in this regard.

It is desirable, therefore, and is a primary object of this invention, to provide a new class of poly-siloxane-polyoxyalkylene block copolymers which, in addition to good potency as stabilizers of flexible polyether-based urethane foam, both non flame-retarded and flame-retarded, have the further advantageous property of allowing for the formation of flame-retarded foam of relatively low burning extent.

A further object is to provide particular flexible polyether urethane foam of substantially reduced combustibility and a method for the manufacture of such foam.

Various other objects and advantages of this invention will become apparent to those skilled in the art from the accompanying description and disclosure.

As a preface to the description of the present invention, it is noted that our U.S. Pat. No. 3,846,462 describes and claims a particular class of siloxanepolyoxyalkylene copolymers which possess the advantageous property of allowing for formation of flame-retarded polyether polyol-based urethane foam of relatively low burning extent. Among other characteristics, such copolymers comprise difunctional siloxy units in which the two organic radicals bonded to silicon are (1) alkyl and (2) either cyanolkyl such as cyanopropyl [NC—$C_3H_6$—] or cyanoalkoxy such as cyanopropoxy [NC—$C_3H_6O$—] including combinations of these particular two types of silicon-bonded cyano-bearing groups. Our said patent, however, does not describe the particular class of novel copolymers to which the teachings of the present invention pertain.

SUMMARY OF THE INVENTION

In accordance with one aspect of the present invention, a particular class of cyano-substituted organosiloxane-polyoxyalkylene polymers are provided which contain chemically combined monofunctional siloxy units ($M_o$) and, for every two moles of $M_o$, an average of from about 10 to about 200 difunctional dialkylsiloxy units (X), an average of from about 2 to about 100 cyano-bearing ether groups (Q) and an average of from about 2 to about 30 polyoxyalkylene blocks (E), the said Q and E groups being bonded to silicon of the $M_o$ units and/or to silicon of difunctional monoalkylsiloxy units (Y and Z, respectively), the polyoxyalkylene content of the polymers being constituted of between about 20 and about 65 weight percent of oxyethylene units. As indicated, the essential silicon-bonded cyano-bearing ether groups are collectively referred to herein by the symbol "Q" and have the formula, $-(O)_q-R'OR''-CN$, where $q$ is zero or one, R' is bivalent alkylene having from 3 to 8 carbon atoms, and R" is bivalent alkylene having from 2 to 4 carbon atoms. Thus, when $q$ is zero, Q is cyanoalkoxyalkyl (that is, $NC-R''O-R'-$) and, when $q$ is one, Q is cyanoalkoxyalkoxy (that is, $NC-R''O-R'O-$). In either case, the cyano substituent is bonded to carbon of the alkylene ether group, $-R''OR'-$, which is in contrast to the composition of the copolymers described and claimed in our aforementioned U.S. Pat. No. 3,846,462, in which cyano is present as silicon-bonded cyanoalkyl or cyanoalkoxy.

In the monofunctional siloxy units encompassed by $M_o$, the respective silicon atoms are bonded to two alkyl groups (R), the third silicon-bonded organic group being the aforesaid cyano-bearing ether group (Q), polyoxyalkylene block (E) or alkyl group (R). Thus, included within the scope of $M_o$ are monofunctional units having the following unit formulae which for brevity are also individually referred to herein as the M, M' and M" units, as shown:

$M = (R)_3SiO_{1/2}$
$M' = (E)(R)_2SiO_{1/2}$
$M'' = (Q)(R)_2SiO_{1/2}$

In any given polymer composition of the present invention, the $M_o$ units may be the same as or different from one another. In the difunctional siloxy units at least one of the two organic groups bonded to the respective silicon atoms is alkyl and the second silicon-bonded organic group is either alkyl as in the X units, the aforesaid cyano-bearing ether group (Q) as in the Y units or a polyoxyalkylene block (E) as in the Z units. Thus, the difunctional X, Y and Z units have the following unit formulae:

$X = (R)_2SiO_{2/2}$
$Y = (Q)(R)SiO_{2/2}$
$Z = (E)(R)SiO_{2/2}$

The organosiloxane-polyoxyalkylene polymers described herein may contain any combination or subcombination of the respective siloxy units within the scope of $M_o$, X, Y and/or Z provided an average of from about 2 to about 100 cyano-bearing ether groups (Q) and from about 2 to about 30 polyoxyalkylene blocks (E) are present, as encompassed by the following Formula I,

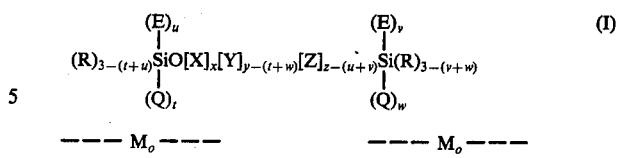

wherein: Q, E, R, X, Y and Z have the aforesaid significance; each of $t$, $u$, $v$, $w$, the sum $t+u$ and the sum $v+w$ independently has a value of zero, or one, each of the sum $t+w$ and the sum $u+v$ independently has a value of zero, one or two, it being evident that the value of the sum $t+u+v+w$ is also zero, one or two; $x$ has an average value from about 10 to about 200; $y$ has an average value from about 2 to about 100; and $z$ has an average value from about 2 to about 30. It is evident from Formula I that $x$, $y-(t+w)$ and $z-(u+v)$ designate the average number of moles of the respective difunctional X, Y and Z units which are present for every two moles of total monofunctional units ($M_o$) as shown, and that the values of $y$ and $z$ correspond to the total number of Q and E groups, respectively, contained in the polymer. Further, when $t+w$ and $u+v$ are zero, $y$ and $z$ also correspond to the respective total number of difunctional Y and Z units contained in the polymer, as expressed on the normalized basis of two moles of $M_o$.

In accordance with another aspect of the present invention, there is provided a process for producing flexible polyurethane foam which comprises reacting and foaming a reaction mixture containing (a) a polyether polyol reactant containing an average of at least two hydroxyl groups per molecule; (b) a polyisocyanate reactant containing at least two isocyanato groups per molecule; (c) a blowing agent; (d) a catalyst comprising a tertiary-amine; and (e) a foam stabilizing component comprising the cyanoalkoxyalkyl- and/or the cyanoalkoxyalkoxy-substituted organosiloxane-polyoxyalkylene polymers of the present invention. In addition to their efficacy as stabilizers of polyether-based urethane foams, it has been found that the organosilicone polymers of this invention possess the further advantageous property of allowing for the formation of flame-retarded foams of reduced combustibility and acceptable overall quality. In accordance with this aspect of the present invention, flame-retarded flexible polyether-based urethane foams are provided by reacting and foaming reaction mixtures which additionally include a flame-retarding agent.

In providing polyurethane foam as described herein, the cyano-substituted organosiloxane-polyoxyalkylene polymers can be introduced to the foam-producing reaction mixtures either as such, in diluted form, in combination with other organosilicone polymers, or preblended with one or more of the polyether polyol reactant, blowing agent, amine catalyst and, when used, the flame-retarding agent.

The present invention also relates to various methods for the preparation of the novel organosiloxanepolyoxyalkylene polymers described herein. One such method comprises the reation of: (1) polyoxyalkylene reactants which at one end are either hydroxyl-terminated or end-blocked by an olefinically unsaturated group, with (2) cyano-substituted polyalkylsiloxane hydrides having the average composition expressed by the following Formula II,

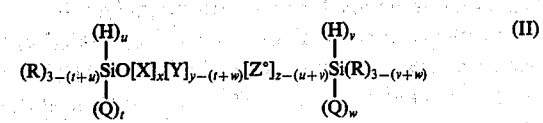

(II)

wherein: Z° is the difunctional hydro-alkylsiloxy unit, (H)(R)SiO$_{2/2}$; X is (R)$_2$SiO$_{2/2}$; Y is (Q)(R)SiO$_{2/2}$ in which Q is the aforesaid —(O)$_q$—R'OR"—CN grouping; and, as defined with respect to Formula I, $x$ has an average value from about 10 to about 200, $y$ has an average value from about 2 to about 100, $z$ has an average value from about 2 to about 30, $t$, $u$, $v$, $w$, $t+u$ and $v+w$ are zero or one, and $t+w$ and $u+v$ are zero, one or two, the respective values of these various parameters corresponding to those of any given polymer composition encompassed by Formula I. Another method for producing copolymers of the invention comprises the overall reaction of: reactant (1) above; (2) olefinically unsaturated cyanoalkyl ethers or hydroxyalkyl cyanoalkyl ethers; and (3) polyalkylsiloxane hydrides having the average composition,

[M][X]$_x$[Z°]$_{y+z}$[M]    (III)

wherein: M, X, Z° and $x$ are as previously defined, and the value of $y+z$ corresponds to that of the sum $y+z$ of any given copolymer composition within Formula I.

DETAILED DESCRIPTION OF THE INVENTION AND PREFERRED EMBODIMENTS

The functionality of the respective types of structural units encompassed by M$_o$, X, Y and Z of the polymers of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the M$_o$ units are chain-terminating or end-blocking units and the respective oxygen atoms thereof are shared with silicon of one other unit which can be X, Y or Z. On the other hand, X, Y and Z are difunctional and thus the respective two oxygen atoms associated with each silicon atom thereof are shared with respective silicon atoms of other units. Thus, the reoccurring difunctional units may be distributed in the polymer randomly, alternately, as sub-blocks of repeating units of the same type, or in any combination of such arrangements. Further, the polymers of the invention comprise mixtures of polymer species which differ in molecular weight, total polyoxyalkylene and siloxane contents, and in the type, arrangement and relative proportions of units. Therefore, as expressed herein, the parameters employed to denote these variables are average values and are based on the relative proportions of reactants from which the various units are derived. It is to be further understood that, consistent with convention in the art to which the present invention pertains, as expressed herein the formulas of the polymers indicate their overall average empirical composition rather than any particular ordered arrangement of units or molecular weight of any particular polymer species. With this understanding, the average composition of the respective types of polymers encompassed by Formula I above may be expressed by the following formulae wherein the various siloxy units are shown in chemically combined form:

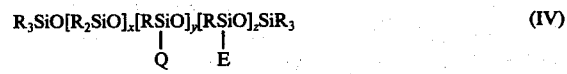

(IV)

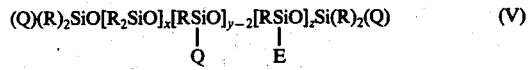

(V)

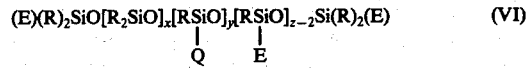

(VI)

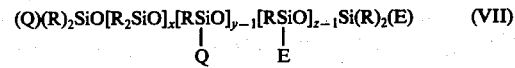

(VII)

wherein: R, Q, E, $x$, $y$ and $z$ are as above defined.

The silicon-bonded R groups are alkyls having from one to ten carbon atoms including linear and branched alkyls. Illustrative of suitable groups encompassed by R are: methyl, ethyl, n-propyl, isopropyl, n-butyl, t-butyl, pentyl, hexyl, octyl and decyl. Of the various groups represented by R, the lower alkyls (that is, those having from one to four carbon atoms) are preferred of which methyl is especially suitable. It is to be understood that the R groups may be the same throughout the polymer or they may differ as between or within units without departing from the scope of this invention. For example, when the endblocking monofunctional units are M, that is, R$_3$SiO$_{1/2}$, they may be trimethylsiloxy units and the difunctional X units, R$_2$SiO$_{2/2}$, may be diethylsiloxy and/or methylethylsiloxy units.

In the Q grouping of the Y and M" units, that is, in —(O)$_q$R'OR"—CN, R' and R" are bivalent alkylene radicals of the series, —C$_c$H$_{2c}$— and —C$_d$H$_{2d}$— respectively, where $c$ is an integer having a value from 3 to 8 (—R'—) and $d$ is an integer having a value from 2 to 4 (—R"—). Illustrative of suitable groups encompassed by —R"— are ethylene (—CH$_2$CH$_2$—); trimethylene (—CH$_2$CH$_2$CH$_2$—); propylene [—CH$_2$CH(CH$_3$)—]; and tetramethylene [—(CH$_2$)$_4$—]. Illustrative of suitable groups encompassed by R' are: trimethylene, propylene, tetramethylene, sec-butylene, hexylene and octylene. The preferred R' groups have from three to four carbon atoms, and may be the same as or different from R'. It is to be understood that the polymer may contain any combination of cyanoalkoxyalkyl (NC—R'\O—R'—) and/or cyanoalkoxyalkoxy (NC—R"O—R'O—) groups encompassed by Q. For example, the Y units of any particular polymer composition may be one or more of the following: 3-(2-cyanoethoxy)propyl methylsiloxy; 3-(3-cyanopropoxy)propyl methylsiloxy; 3-(2-cyanoethoxy)propoxy methylsiloxy; 3-(2-cyanoethoxy)propyl ethylsiloxy; 3-(2-cyanoethoxy)-2-methylpropyl methylsiloxy; 8-(2-cyanoethoxy)octyl methylsiloxy; 3-(2-cyano-2-methylethoxy)propyl methylsiloxy; 3-(2-cyano-2-ethylethoxy)propyl methylsiloxy; and the like. Further, when the polymers of the invention contain Q-modified monofunctional units (M"), such units may be 3-(2-cyanoethoxy)propyl dimethylsiloxy; 3-(2-cyanoethoxy)propoxy dimethylsiloxy; 3-(2-cyanoethoxy)propyl diethylsiloxy; 3-(2-cyanoethoxy)propyl methylethylsiloxy; and the like.

The average composition of the preferred polyoxyalkylene blocks (E) of the Z and M' units is, $-(R^\circ)_p-(OC_aH_{2a})_b-OG$, wherein: $p$ is zero or one; $-R^\circ-$ comprises a bivalent alkylene group a carbon atom of which is bonded to silicon; $a$ has a value from 2 to 4 provided from about 20 to about 65 weight percent of the oxyalkylene units of the polyoxyalkylene chain, $-(C_aH_{2a}O)_b-$, is constituted of oxyethylene units; $b$ has an average value such that the average molecular weight of the polyoxyalkylene chain is from about 1000 to about 6000; and G is an organic cap. The remainder of the polyoxyalkylene chain is usually formed of oxypropylene, oxybutylene or a combination of such units, although preferably the remainder is oxypropylene. It is to be understood that the oxyethylene and other oxyalkylene units can be randomly distributed throughout the polyoxyalkylene chain or they can be grouped in respective sub-blocks, provided the total average content of $-(C_2H_4O)-$ in the chain is within the aforesaid range. Most preferably, the polyoxyalkylene blocks have the formula, $GO(C_3H_6O)_m(C_2H_4O)_n-$ wherein $m$ has an average value of from about 6 to about 82 and $n$ has an average value from about 4.5 to about 90, provided the average molecular weight of the chain, $-(C_3H_6O)_m(C_2H_4O)_n-$, is within the aforesaid range of 1000 to 6000, and from about 20 to about 65 weight per cent of the chain is constituted of oxyethylene units.

When present, the linking group $(-R^\circ-)$ between silicon and that portion of the polyoxyalkylene block shown as $-(OC_aH_{2a})_bOG$, is a bivalent alkylene group, an alkylene-C(O)— group or an —alkylene—NH—C(O)—group wherein the free valence of alkylene of the latter two groups is bonded to silicon. In these linking groups, alkylene has the more specific formula, $-C_eH_{2e}-$, where $e$ has a value from 2 to 6 and is usually no more than four. Illustrative of suitable groups encompassed by R° are: ethylene, trimethylene, propylene, tetramethylene, hexamethylene; corresponding $-C_eH_{2e}-C(O)-$ groups which together with oxygen of the polyoxyalkylene chain form an ester linkage; and corresponding $-C_eH_{2e}-NH-C(O)-$ groups which in combination with oxygen of the polyoxyalkylene chain form carbamate linkages.

As further indicated by the formula of the polyoxyalkylene blocks (E) of the Z and M' units, the poly(oxyalkylene) chain is terminated by the organic group, GO—, wherein G is a monovalent organic capping group. Illustrative of the organic caps encompassed by G are such groups as: R°°—, R°°NHC(O)—, and R°°C(O)—, wherein R°°is a monovalent hydrocarbon radical having from 1 to 12 carbon atoms, and is usually free of aliphatic unsaturation. The groups (GO—) which endblock the polyoxyalkylene chains are, therefore, corresponding R°°O—, R°°NHC(O)— and R°°C(O)O— monovalent organic radicals. In the aforesaid capping (G) and terminal (GO—) groups, R°° can be any of the following: an alkyl group including linear and branched chain alkyl groups having the formula, $C_fH_{2f+1}-$, wherein $f$ is an integer from 1 to 12, such as, for example, methyl, ethyl, n-propyl, isopropyl, n-butyl, octyl and dodecyl groups; a cycloaliphatic radical including monocyclic and bicyclic groups such as, for example, cyclopentyl, cyclohexyl and bicyclo[2.2.1-]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl-substituted cycloaliphatic radicals such as, for example, methylcyclopentyl and phenylcyclohexyl radicals; and the like. It is evident, therefore, that the terminal group (GO—) of the polyoxyalkylene chain can be corresponding alkoxy, aryloxy, aralkoxy, alkaryloxy, cycloalkoxy, acylox, aryl—C(O)O—, alkyl carbamate and aryl carbamate groups.

The generally preferred R°° groups are phenyl, lower alkyl radicals, the lower alkyl-substituted aryl groups and the aryl-substituted lower alkyl groups, wherein the term "lower alkyl" denotes $C_1-C_4$ alkyl radicals. Therefore, illustrative of the preferred capping groups represented by G are: methyl, ethyl, propyl, butyl, phenyl, benzyl, phenylethyl ($C_6H_5-C_2H_4-$), acetyl, benzoyl, methylcarbamyl [$CH_3NHC(O)-$], ethylcarbamyl [$C_2H_5NHC(O)-$], propyl- and butyl-carbamyl groups, phenylcarbamyl [$C_6H_5NHC(O)-$], tolylcarbamyl [$(CH_3)C_6H_4NHC(O)-$], benzylcarbamyl [$C_6H_5CH_2NHC(O)-$], and the like.

It is to be understood that the terminal organic radical (GO—) of the respective polyoxyalkylene blocks of the polymers of the present invention may be the same throughout the polymer or may differ. For example, the polymer compositions of this invention can contain polyether blocks in which the terminal group (GO—) is methoxy, and other polyether groups in which GO— is a hydrocarbylcarbamate group such as methylcarbamate, $CH_3NHC(O)O-$, or benzyloxy ($C_6H_5CH_2O-$).

When used to stabilize polyether polyol-derived flexible foam, an average of from about 55 to about 85 weight percent of the cyano-substituted organosiloxane-polyoxyalkylene polymers of the invention is constituted of polyoxyalkylene blocks (E) which portion of the polymers is also referred to herein as the total polyether content. Correspondingly, the total siloxane content of the polymers is from about 45 to about 15 weight percent, and represents the sum of the combined weight of the units encompassed by the $M_o$, X, Y and Z units less the total weight of the polyoxyalkylene blocks (E).

In the polymers described herein, the alkyls (R) are of course bonded to silicon by silicon-to-carbon bonds. On the other hand, the respective cyano-bearing ether groups (Q) and polyoxyalkylene blocks (E) shown in Formulas I and IV-VII, may be bonded to silicon through silicon-to-carbon or silicon-to-oxygen bonds, as expressed by the following general formulas:

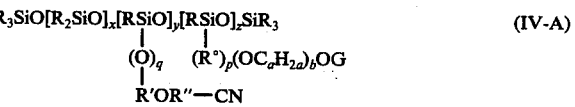

(IV-A)

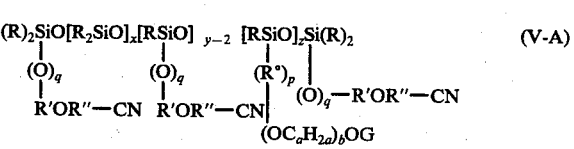

(V-A)

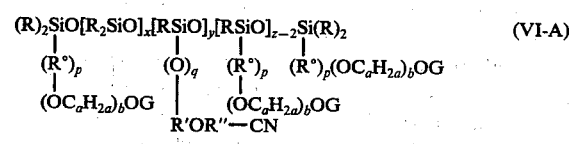

(VI-A)

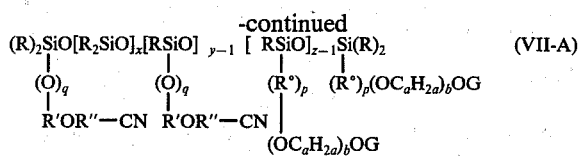

(VII-A)

wherein, as previously defined, $q$ and $p$ may independently be zero or one. Thus, the cyano-substituted organosiloxanepolyoxyalkylene polymers of the invention may be: (1) non hydrolyzable with respect to both the polyoxyalkylene blocks and cyano-substituted ether groups (when $p$ is one and $q$ is zero); (2) hydrolyzable with respect to both the polyoxyalkylene blocks and cyano-substituted ether groups (when $p$ is zero and $q$ is one); (3) hydrolyzable with respect to the polyoxyalkylene blocks and non hydrolyzable with respect to the cyano-substituted ether groups (when both $p$ and $q$ are zero); and (4) non hydrolyzable with respect to the polyoxyalkylene blocks and hydrolyzable with respect to the cyano-substituted ether groups (when both $p$ and $q$ are one).

From the standpoint of use as stabilizers of flame-retarded polyether-based urethane foam, preferred polymers of the invention are those having the average compositions:

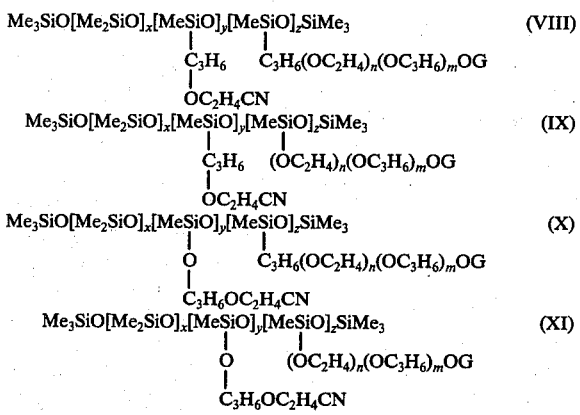

wherein: Me represents methyl ($-CH_3$); $x$ has an average value from about 10 to about 200, $y$ has an average value from about 2 to about 100, $z$ has an average value from about 2 to about 30, the average values of $x$, $y$ and $z$ in any given polymer composition being such that the siloxane and polyether contents of the polymer are within the aforesaid ranges; G represents an $R^{\circ\circ}-$, $R^{\circ\circ}C(O)-$ or $R^{\circ\circ}NHC(O)-$ group, where $R^{\circ\circ}-$ is lower alkyl, ar(lower)alkyl, or phenyl; and $m$ and $n$ are positive numbers such that the average oxyethylene content of the oxyalkylene chain ranges from about 20 to about 65 weight per cent and the average molecular weight of the chain is from about 1000 to about 6000.

From the standpoint of relative proportions of the X, Y and Z units, the preferred polymers of the invention for use as stabilizers of polyether urethane foam, are those wherein $x$ has an average value from about 20 to about 100, $y$ has an average value from about 3 to about 30, and $z$ has an average value from about 2 to about 10.

The polymers of the invention are prepared by any one of a number of reactions, the particular method employed depending primarily on whether the polyoxyalkylene blocks (E) are linked to silicon through an Si—C or Si—O—C linkage and whether the bond between silicon and the cyano-substituted ether groups (Q) is Si—C (that is, when Q is $-R'OR''-CN$) or Si—O—C (that is, when Q is $-O-R'OR''-CN$).

One method for providing polymer compositions of the invention in which the polyoxyalkylene blocks of the Z and/or M' units are linked to silicon through Si—C bonds comprises the platinum-catalyzed addition of monoolefinic polyoxyalkylene ethers to the Q-substituted polyalkylsiloxane Si-H fluids encompassed by Formula II hereinabove. The hydrosilation reaction is referred to herein as Method A and is illustrated by the following equation wherein the said Si—H reactant is expressed by Formula II-A, as shown:

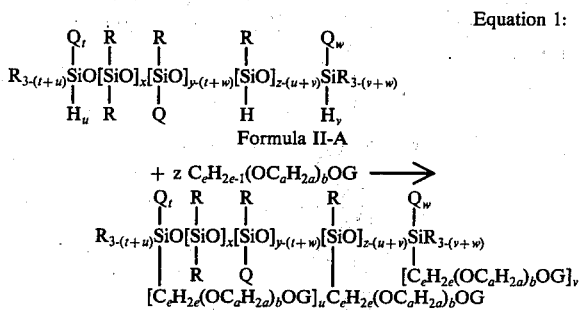

Equation 1:

wherein as previously defined herein: Q is the cyano-bearing ether group, $-(O)_q-R'OR''-CN$; R is alkyl; G is an organic cap; $-(OC_aH_{2a})-$ is a poly(oxyalkylene) chain constituted of from about 20 to about 65 weight percent oxyethylene; $e$ has a value from 2 to 6; $t$, $u$, $v$, $w$, $t+u$ and $v+w$ have respective values of zero or one; $t+w$ and $u+v$ have respective values of zero, one or two; $x$ has an average value from about 10 to about 200; $y$ has an average value from about 2 to about 100; and Z has an average value from about 2 to about 30.

Preferably, the monoolefinic group, $-C_eH_{2e-1}$, of the polyether reactant employed in Method A is vinyl, allyl or methallyl, the allyl end-blocked reactants being especially suitable. One method for preparing such polyether reactants comprises starting alkylene oxide polymerization with an alkenol having at least three carbon atoms such as allyl alcohol to provide $HO(C_aH_{2a}O)_b$-$C_eH_{2e-1}$ (wherein $e$ has a value of at least 3), followed by capping of the terminal hydroxyl group with the aforesaid organic radical G—, such as methyl, phenyl, benzyl, acetyl, methylcarbamyl and like capping groups. Further details concerning the method of preparation of such polyether reactants are as described in British Patent Specifications 1,220,471 and 1,220,472. Alternatively, the polyether reactants can be prepared by starting the alkylene oxide polymerization with an alkanol such as methanol or butanol, an aralkyl alcohol such as benzyl alcohol, phenol and the like, followed by capping of the terminal hydroxyl group of the reaction product with the monoolefinic group such as vinyl, allyl, methallyl and the like. Of these monoolefinically unsaturated polyether reactants, allyl alcohol-started polyoxyalkylene ethers are especially suitable. It is to be understood that the polyoxyalkylene chain, $-(C_aH_{2a}O)_b-$, of the polyether reactants is composed of from about 20 to about 65 weight percent of oxyethylene units, $-(C_2H_4O)-$, the remaining oxyalkylene units being oxypropylene and/or oxybutylene, as described hereinabove with reference to the nature of the polyoxyalkylene blocks (E) of the copolymeric product. The different types of oxyalkylene units can be randomly distributed throughout the chain such as when a mixture of alkylene oxides is polymerized, or they can be arranged as sub-blocks such as when the respective alkylene oxides are polymerized sequentially.

The polymers of this invention wherein polyoxyalkylene blocks are joined to silicon through an Si—O—C bond (that is, the compositions encompassed by Formulas IV-A through VII-A above wherein $p$ is zero), are provided by the catalyzed condensation of silicon-bonded hydrogen of the Q-substituted polyalkylsiloxane hydride fluids with hydrogen of the —OH group of hydroxyl-terminated polyether reactants. This method is referred to herein as Method B and is illustrated by the reaction of the following equation 2 in which the said hydride reactant has the average composition expressed by Formula II-A shown in above equation 1.

Equation 2:

Si—H Reactant of Formula II-A + z HO—$(C_aH_{2a}O)_bG$ ⟶

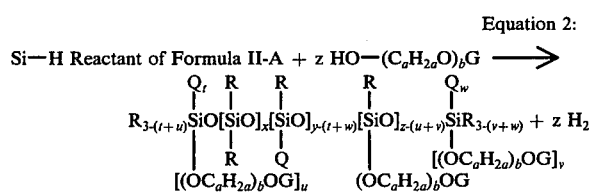

wherein: Q, R, G, —$(OC_aH_{2a})_b$—, $t$ through $z$, $t+u$, $v+w$, $t+w$ and $u+v$ have the aforesaid significance such as is summarized with specific reference to equation 1.

From equations 1 and 2 it is evident that when $t$, $u$, $v$ and $w$ are zero, the respective polymer products are endblocked by M units [$(R)_3SiO_{\frac{1}{2}}$] and the polymer products are of the type encompassed by Formula IV, as illustrated by the following equations 1a and 2a:

Equation 1a:
$R_3SiO[R_2SiO]_x[RSiO]_y[RSiO]_zSiR_3$ + z GO$(C_aH_{2a}O)_bC_eH_{2e-1}$
         |       |
         Q       H

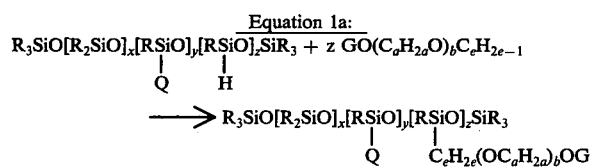

Equation 2a:
$R_3SiO[R_2SiO]_x[RSiO]_y[RSiO]_zSiR_3$ + z G$(OC_aH_{2a})_b$—OH
         |       |
         Q       H

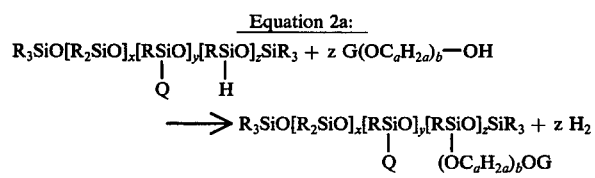

wherein R, Q, G, x, y, z, a and b are as previously defined.

It is also evident from equations 1 and 2 that: (1) when $t$ and $w$ are both one and thus $u$ and $v$ are zero, the end-blocking units are M″ [$(Q)(R)_2SiO_{\frac{1}{2}}$] and the polymer products are of the type encompassed by Formula V; (2) when $t$ and $w$ are both zero and $u$ and $v$ are both one, the endblocking units are M′ [$(E)(R)_2SiO_{\frac{1}{2}}$] and the copolymers are within the scope of Formula VI; (3) when $t$ and $v$ are both one and thus $u$ and $w$ are zero, the copolymers are endblocked by different monofunctional units (M′ and M″) as defined by Formula VII; and (4) when the sum $t+u+v+w$ is one, the copolymers also have different endblocking units, that is, a combination of M and M′ or M″.

When the cyano-substituted ether group [—$(O)_q$—R—′OR″—CN, also expressed herein as —$(O)_qC_cH_{2c}OC_dH_{2d}$—CN] of the Y and/or M″ units of the polymers of this invention is bonded to silicon by an Si—C bond, that is, when $q$ is zero, the polymers may also be prepared by the method which comprises the platinum-catalyzed addition of polyalkylsiloxane hydrides or polyether-substituted polyalkylsiloxane hydrides to monoolefinic cyanoalkyl ethers having the formula, $C_cH_{2c-1}OC_dH_{2d}CN$, where c, as previously defined has a value from 3 to 8, and d has a value from 2 to 4. For example, in accordance with one embodiment of this method, referred to herein as Method C, the hydrosilation of the monoolefinic cyanoalkyl ether is carried out concurrently with hydrosilation of monoolefinically endblocked polyether reactants as illustrated by the following equation 3 in which the Si—H reactant is that encompassed by above Formula III.

Equation 3:

$R_3SiO[R_2SiO]_x[RSiO]_{y+z}SiR_3$ +
         |
         H y $C_cH_{2c-1}OC_dH_{2d}CN$

+ z GO$(C_aH_{2a}O)_bC_eH_{2e-1}$ ⟶

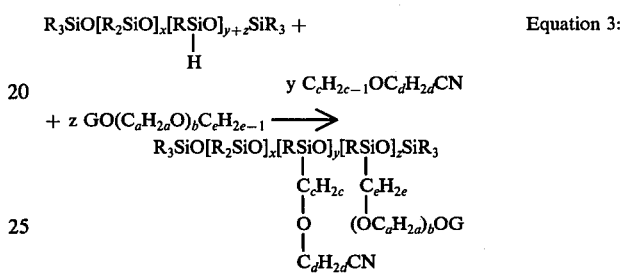

It is to be understood that the reaction of equation 3 may also be carried out by first hydrosilating z moles of the polyether reactant to provide an intermediate having the average composition,

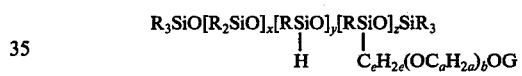

which is then reacted with y moles of the monoolefinic cyanoalkyl ether to provide the product shown in equation 3.

In accordance with still another embodiment of Method C, the polyalkylsiloxane hydride fluid shown in equation 3 is reacted initially with y moles of the monoolefinic cyanoalkyl ether followed by reaction of the intermediate cyanoalkoxyalkyl-modified polyalkylsiloxane hydride with z moles of either the monoolefinically unsaturated polyether reactant shown in equation 1 or the hydroxylterminated polyether reactant shown in equation 2. This sequence of reactions is illustrated by equations 3a–3c wherein allyl 2-cyanoethyl ether is shown as the cyano-bearing reactant:

Equation 3a:
$R_3SiO[R_2SiO]_x[RSiO]_{y+z}SiR_3$ +
         |
         H y $CH_2=CHCH_2OCH_2CH_2CN$

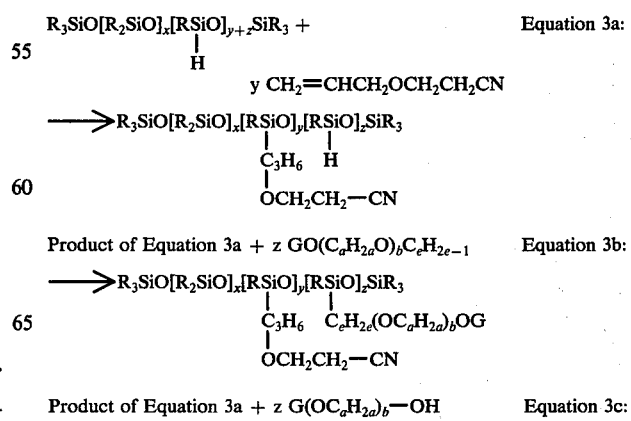

Product of Equation 3a + z GO$(C_aH_{2a}O)_bC_eH_{2e-1}$   Equation 3b:

Product of Equation 3a + z G$(OC_aH_{2a})_b$—OH   Equation 3c:

-continued

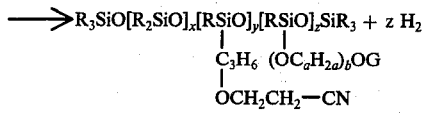
$$R_3SiO[R_2SiO]_x[RSiO]_y[RSiO]_zSiR_3 + z\ H_2$$
with substituent $C_3H_6\ (OC_aH_{2a})_bOG$ and $OCH_2CH_2-CN$ wherein R, G, a, b, e, x, y and z are as previously defined. When R is methyl and the polyether reactants are $GO(C_2H_4O)_n(C_3H_6O)_mCH_2CH=CH_2$ and $GO(C_2H_4O)_n(C_3H_6O)_m$—H, the polymer products of equations 3b and 3c have the average compositions shown hereinabove by Formulas VIII and IX, respectively.

When the cyano-substituted ether groups, $-(O)_q-R-'OR''-CN$, of the siloxane-polyoxyalkylene block copolymers of this invention are cyanoalkoxyalkoxy groups, that is, when q is one, the polymers are prepared by the method which comprises hydrogen condensation of Si—H and HO-C groups derived respectively from polyalkylsiloxane hydrides and hydroxyalkyl cyanoalkyl ethers having the formula, $HO-C_cH_{2c}-O-C_dH_{2d}-CN$ wherein the value of c, as previously defined, is from 3 to 8, and the value of d is from 2 to 4. In accordance with one embodiment of this method, referred to herein as Method D, the condensation reaction is carried out simultaneously with hydrogen condensation of Si-H of the polyalkylsiloxane hydride and HO-C of hydroxyl-terminated polyether reactants, as shown by the following equation 4 in which the Si-H reactant is also that encompassed by Formula III.

Equation 4:

$R_3SiO[R_2SiO]_x[RSiO]_{y+z}SiR_3 +$
with H substituent $+ y\ HO-C_cH_{2c}-O-C_dH_{2d}-CN$
$+ z\ G(OC_aH_{2a})_bOH \longrightarrow$

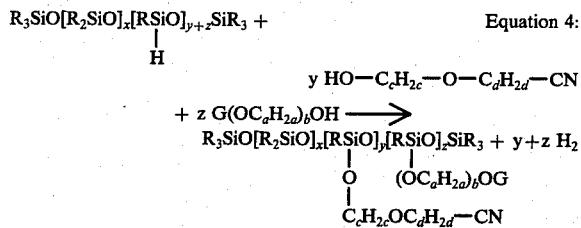
$R_3SiO[R_2SiO]_x[RSiO]_y[RSiO]_zSiR_3 + y+z\ H_2$
with substituents $O\ (OC_aH_{2a})_bOG$ and $C_cH_{2c}OC_dH_{2d}-CN$ wherein R, G, a, b, c, d, x, y and z have the above defined significance. It is to be understood that the reaction of equation 4 may also be carried out by first reacting z moles of the polyether reactant with the polyalkylsiloxane hydride to provide an intermediate having the average structure:

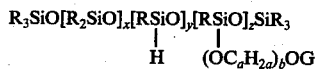
$R_3SiO[R_2SiO]_x[RSiO]_y[RSiO]_zSiR_3$
with H and $(OC_aH_{2a})_bOG$ substituents which is then reacted with y moles of the hydroxyalkyl cyanoalkyl ether to provide the polymer product shown in equation 4. In accordance with another embodiment of Method D, the polyalkylsiloxane hydride fluid is partially reacted initially with y moles of the cyano-bearing ether reactant followed by reaction of the intermediate cyanoalkoxyalkoxy-modified Si-H fluid with z moles of either the monoolefinically unsaturated polyether reactant shown in equation 1 or the hydroxyl-terminated polyether reactant shown in equation 2. This sequence of reactions is illustrated by the following equations 4a–4c:

Equation 4a:

$R_3SiO[R_2SiO]_x[RSiO]_{y+z}SiR_3 +$
with H substituent $y\ HO-C_cH_{2c}-O-C_dH_{2d}-CN$

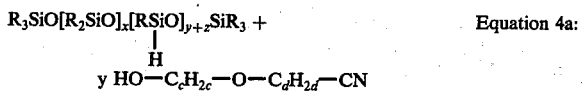
$$R_3SiO[R_2SiO]_x[RSiO]_y[RSiO]_zSiR_3 + y\ H_2$$
with substituents O, H and $C_cH_{2c}OC_dH_{2d}-CN$ Product of Equation 4a + $z\ GO(C_aH_{2a}O)_bC_eH_{2e-1}$   Equation 4b:

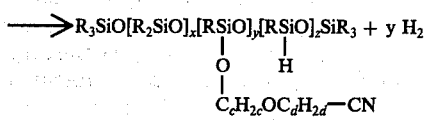
$$R_3SiO[R_2SiO]_x[RSiO]_y[RSiO]_zSiR_3$$
with substituents O, $C_eH_{2e}(OC_aH_{2a})_bOG$ and $C_cH_{2c}OC_dH_{2d}-CN$ Product of Equation 4a + $z\ G(OC_aH_{2a})_b-OH$   Equation 4c:

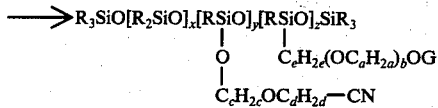
$$R_3SiO[R_2SiO]_x[RSiO]_y[RSiO]_zSiR_3 + z\ H_2$$
with substituents O, $(OC_aH_{2a})_bOG$ and $C_cH_{2c}OC_dH_{2d}-CN$ wherein R, G, a, b, c, d, e, x, y and z are as previously defined. When R is methyl, and the cyano-bearing ether reactant is 3-hydroxypropyl 2-cyanoethyl ether (and thus c is three and d is two), and the polyether reactants are $GO(C_3H_6O)_m(C_2H_4O)_nCH_2CH=CH_2$ and $GO(C_3H_6O)_m(C_2H_4O)_n$—H, the polymer products of equations 4b and 4c have the compositions shown hereinabove by Formulas X and XI, respectively.

The hydrosilation reactions illustrated by equations 1, 1a, 3, 3a, 3b and 4b, which overall comprise the addition of Si—H to the respective monoolefinic groups of the polyether and cyano-substituted monoether reactants, are effected in the presence of a platinum catalyst. Particularly effective is platinum in the form of chloroplatinic acid dissolved, if desired, in a solvent such as tetrahydrofuran, ethanol, butanol or mixed solvents such as ethanol-ethylene glycol dimethyl ether. It is to be understood, however, that other platinum derivatives known to the art as hydrosilation catalysts may also be used such as those prepared in accordance with the method of U.S. Pat. No. 3,220,972. The platinum is present in a catalytic amount such as, for example, from about 5 to about 400 parts by weight per million (p.p.m.) parts of the combined weight of the silicon-containing and organic reactants. The more usual platinum concentration is from about 25 to about 300 p.p.m. Suitable reaction temperatures range from about room temperature (20° C.) to about 200° C., and are more usually from about 60° C. to about 160° C.

The condensation reactions illustrated by equations 2, 2a, 3c, 4, 4a and 4c which overall comprise the reaction of silanic hydrogen (Si—H) and hydrogen of the —OH groups of the hydroxyl-terminated polyether reactant and the hydroxyalkyl cyanoalkyl ether reactant, are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyltin dilaurate. These catalysts are employed in amounts from about 0.1 to about 5, and usually no more than about 2, weight percent, based on the total weight of the reactants. The Si—H/HO—C condensation reactions are effected at temperatures from about 60° C. to about 150° C., and more usually from about 80° C. to about 120° C.

The various reactions of equations 1 through 4c are usually carried out employing the organic reactants (that is, the polyether and cyano-substituted ether) in amounts at least sufficient to react with a predetermined proportion of the silicon-bonded hydrogen of the Si-H reactant. From the standpoint of more effective and more complete reaction of silanic hydrogen, the organic reactants are usually employed in excess of stoichiometric requirements. In those reactions (equations 1, 1a, 2, 2a, 3b, 3c, 4b and 4c) wherein the Si-H groups are to be completely reacted with only one of the organic reactants to form the desired final polymer, the organic reactant may be employed in amounts of up to a 100 or more mole percent excess. In the case of the polyether reactant, however, usually no more than about a 50 mole percent excess is used. On the other hand, when the Si-H reactant is either partially reacted initially with one of the organic reactants as shown, for example, by equations 3a and 4a, or is reacted with the polyether and cyano-substituted ether reactants concurrently as shown by equations 3 and 4, the organic reactants are employed in an amount just sufficient to satisfy the predetermined stoichiometric requirements of the desired reaction or only a small excess such as up to about 50 (e.g., 20 to 30) mole percent is used. With respect to the hydrosilation reactions of equations 3 and 3a it is usually desirable to employ the monoolefinic cyanoalkyl ether in excess of the desired stoichiometric reaction in view of the tendency of such reactants to undergo isomerization and reduction. For example, the allyl 2-cyanoethyl ether reactant shown in equation 3a can undergo isomerization and reduction in the presence of Si-H and platinum catalyst to form the respective by-products, $CH_3CH=CHOCH_2CH_2CN$ and $CH_3CH_2CH_2OCH_2CH_2CN$.

The hydrosilation and condensation reactions may be conducted in the absence or presence of a solvent. Illustrative solvents are any of the following employed individually or in combination with one another: the normally liquid aromatic hydrocarbons such as benzene, toluene and xylene; alcohols such as n-propanol and isopropanol; ethers; ether alcohols; and other such non polar or polar solvents. Upon completion of the respective hydrosilation and condensation reactions, any unreacted monoolefinic cyanoalkyl ether (including by-products derived therefrom) or hydroxyalkyl cyanoalkyl ether, or any organic solvent employed in the polymer preparation, may be removed by conventional separation techniques to obtain the final product comprising the polymer compositions of the invention. It is to be understood, however, that some portion or all of the solvent and excess reactants including by-products thereof and the polyether reactant may remain in the product and that such diluted polymer compositions are within the scope and may be used in accordance with the teachings of this invention. In the hydrosilation reactions, the removal or neutralization of the chloroplatinic acid catalyst is usually desirable for long range product stability. Neutralization is readily effected by adding sodium bicarbonate to the reaction mixture followed by filtration of the resultant slurry to remove the neutralizing agent and platinum residues.

The Q-modified polyalkylsiloxane hydrides encompassed by Formulas II and II-A and employed in the reactions of equations 1, 1a, 2, 2a, 3b, 3c, 4b and 4c, are in turn provided by any one of a number of methods. Overall, the methods employed in providing such cyano-substituted Si-H compositions comprise the use of various combinations of the precursor reactants described below as the source of the indicated siloxy units or Q groups.

a. Hexaalkyldisiloxanes, $R_3SiOSiR_3$, when the endblocking units are $R_3SiO_{\frac{1}{2}}$, that is, when $t$, $u$, $v$ and $w$ of Formulas II and II-A are zero.

b. Di[cyanoalkoxyalkyl]tetraalkyldisiloxanes, (NC-R"OR') $(R)_2SiOSi(R)_2(R'OR''$-CN), when the endblocking units are (NC-R"OR')$(R)_2SiO_{\frac{1}{2}}$, that is, when $t$ and $w$ of Formulas II and II-A are both one. Such reactants in turn are prepared by hydrolysis of (NC-R"OR')$(R)_2SiX°$ where X° is chlorine or bromine, employing about one mole of water for every two moles of halide.

c. Dihydrogentetraalkyldisiloxanes, $(H)(R)_2SiOSi(R)_2(H)$, when the endblocking units are $(H)(R)_2SiO_{\frac{1}{2}}$, that is, when $u$ and $v$ of Formulas II and II-A are both one.

d. Cyclic dialkylsiloxane polymers, $[R_2SiO]_h$, where $h$ usually has an average value of from about 3 to about 6, as the source of the difunctional dialkylsiloxy units (X), $R_2SiO_{2/2}$.

e. Trialkyl-endblocked dialkylsiloxane polymers, $R_3SiO(R_2SiO)_rSiR_3$, where $r$ has an average value of at least two and is usually no more than about 10, as the source of the endblocking units, $R_3SiO_{\frac{1}{2}}$, and as a source of the dialkylsiloxy units (X), $R_2SiO_{2/2}$.

f. Cyanoalkoxyalkyl-alkylsiloxane polymers as the source of the

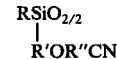

units encompassed by Y where, as previously defined, R' is the bivalent alkylene radical, $-C_cH_{2c}-$, $c$ having a value from 3 to 8 and R" is bivalent alkylene, $-C_dH_{2d}-$, $d$ having a value from 2 to 4. These polymers are formed by the hydrolysis of cyanoalkoxyalkyldichlorosilanes, NC—R"OR'—Si(R)Cl$_2$, followed by the basecatalyzed dehydration-cyclization of the hydrolyzate to form cyclics having the formula, [NC-R"OR'-Si(R)O]$_w$, the average value of $w$ being 3 or more.

g. Cyanoalkoxyalkylheptaalkylcyclotetrasiloxanes, [(NC-R"OR')(R)SiO][(R)$_2$SiO]$_3$, as the source of both the X units and the (NC-R"OR')(R)SiO$_{2/2}$ units encompassed by Y. Such cyclics are in turn provided by the platinum-catalyzed hydrosilation reaction between hydrogenheptaalkylcyclotetrasiloxanes, [(H)(R)SiO][(R)$_2$SiO]$_3$, and the monoolefinic cyanoalkyl ethers defined hereinbelow as reactant (i).

h. Polymeric alkysiloxane hydride fluids having an Si—H content sufficient to provide from about 200 to about 372 cubic centimeters of hydrogen per gram, as the source of

that is, the Z° units of Formula II.

i. Monoolefinic cyanoalkyl ethers, $C_cH_{2c-1}OC_dH_{2d}CN$, wherein $c$ is from 3 to 8 and $d$ is from 2 to 4 as the source of NC—R"OR'— of the NC—R"OR'—Si(R)O$_{2/2}$ units encompassed by Y, wherein R' and R" are more particularly shown as the bivalent alkylene radicals, $-C_cH_{2c}-$ and $-C_dH_{2d}-$, respectively.

j. Hydroxyalkyl cyanoalkyl ethers, NC—R"OR'—OH, as the source of the NC—R"OR'—O — groups of the NC—R"OR'O—Si(R)O$_{2/2}$ units encompassed by Y, wherein R' and R" are also more particularly expressed as the above defined bivalent alkylene radicals, $-C_cH_{2c}-$ and $-C_dH_{2d}-$, respectively.

From Formulas II and II-A it is evident that, when each of $t$, $u$, $v$ and $w$ is zero and Y has the unit formula, $(NC-R"OR')(R)SiO_{2/2}$, the cyano-substituted Si—H fluids have the average composition encompassed by the following Formula II-B wherein R' and R" are expressed as $-C_cH_{2c}-$ and $-C_dH_{2d}-$, respectively;

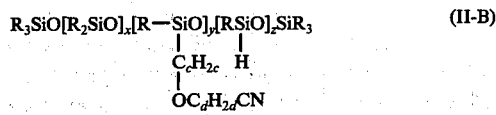

wherein: R, as previously defined, is alkyl having from one to ten carbon atoms and is preferably lower alkyl; $c$ has a value of 3 to 8; $d$ has a value of 2 to 4; $x$ has an average value from about 10 to about 200; $y$ has an average value from about 2 to about 100; and $z$ has an average value from about 2 to about 30. The compositions encompassed by Formula II-B are suitably employed to provide copolymers of the invention as illustrated by equations 3b and 3c hereinabove.

One method for preparing the compositions encompassed by Formula II-B comprises equilibration of various combinations of reactants (a) and (d)-(h). Illustrative are the reactions of the following equations 5 and 6 which comprise equilibration of reactants (a) or (e), (d), (f) and (h), and in which polymeric reactants (d), (f) and (h) are shown, for convenience, simply as the siloxy units which they provide to the equilibrated reaction product.

Equation 5:
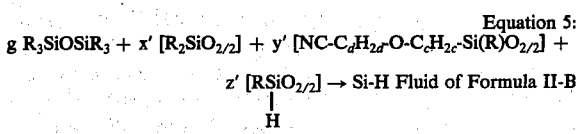

Equation 6:
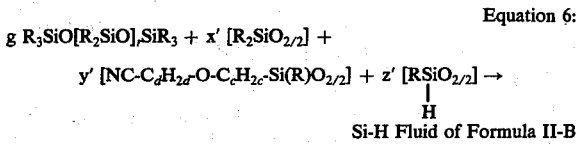

In the above equations 5 and 6 and other equations hereinbelow, $g$ represents the actual number of moles of the indicated reactant, and $x'$, $y'$ and $z'$ represent the actual number of moles (or mole-equivalents) of the indicated monomeric units provided by the polymeric source of such units. It is to be understood, therefore, that $g$, $x'$, $y'$ and $z'$ can be any positive numbers depending upon the scale on which the reactions are run, provided that when normalized on the basis of $g=1$ (or two moles of monofunctional units), the average values of the mole ratios $x':y':z'$ (equation 5) and $[x'+(g \times r)]:y':z'$ (equation 6) are 10-200:2-100:2-30, respectively, thereby providing Si—H fluids wherein the ratio $x:y:z$ has a corresponding average value of 10-200:2-100:2-30, as previously defined.

In addition to the reactions of equations 5 and 6, the Si—H fluids encompassed by Formula II-B may also be prepared by the equilibration of reactants (a), (g) and (h), as illustrated by the following equation 7.

Equation 7:
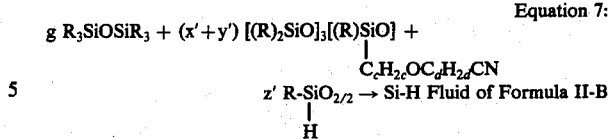

It is evident that in the cyanoalkoxyalkyl-modified polyalkylsiloxane hydrides produced by the reaction of equation 7, the ratio of $x:y$ will of course be 3:1, corresponding to the ratio of the X and Y units present in reactant (g). The ratio of $x:y$ may be adjusted to above or below 3:1, as desired, by effecting the reaction of equation 7 in the presence of reactant (d) as an additional source of the X units, thereby increasing the ratio above three, or by the employment of an appropriate proportion of reactant (f) as an additional source of the Y units, $(NC-R"OR')(R)SiO_{2/2}$, thereby decreasing the ratio to less than three.

With further reference to general Formulas II and II-A, it is evident that when $t$ and $w$ are both one and Q is cyanoalkoxyalkyl, the Si—H fluids have the average composition depicted by the following Formula II-C in which the cyanoalkoxyalkyl groups are expressed as $NC-C_dH_{2d}-O-C_cH_{2c}-$.

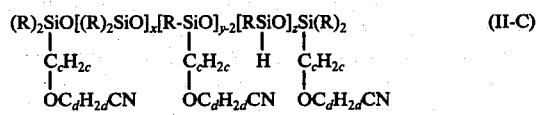

wherein R, $c$, $d$, $x$, $y$ and $z$ are as previously defined such as is summarized with specific reference to Formula II-B. Such compositions are employed to provide the cyanoalkoxyalkyl-substituted polysiloxane-polyoxyalkylene copolymers within the scope of Formfula V-A (wherein $q$ is zero) by application of the reactions of equations 1 and 2 above. The Si—H compositions defined by Formula II-C are in turn provided by effecting the equilibration reactions of equations 5-7 in the presence of reactant (b) instead of reactants (a) and/or (e), as illustrated by the following modification of equation 5.

Equation 8:
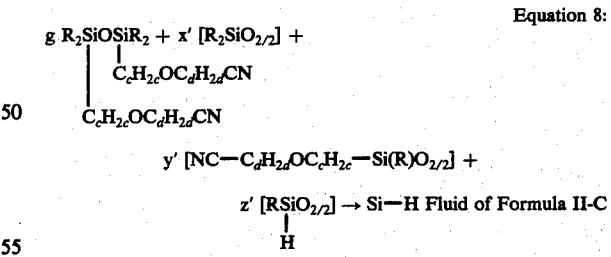

When $y$ of Formula II-C is two, it is evident that the cyanoalkoxyalkyl groups are present solely in the end-blocking monofunctional units (M") and that such compositions are provided by effecting the reaction of equation 8 in the absence of the cyclic source of the Y units, that is, in the absence of reactant (f).

With further reference to general Formulas II and II-A, it is evident that when $u$ and $v$ are both one and Q is cyanoalkoxyalkyl, the Si—H fluids have the average composition depicted by the following Formula II-D in which the cyanoalkoxyalkyl groups are expressed as $NC-C_dH_{2d}-O-C_cH_{2c}-$.

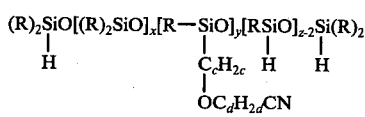 (II-D)

wherein R, c, d, x, y and z are also as summarized with specific reference to Formula II-B. Such compositions are employed, for example, to provide the cyanoalkoxyanlkylsubstituted polysiloxane-polyoxyalkylene copolymers within the scope of Formfula VI-A by application of the reactions of equations 1 and 2. The Si-H compositions defined by Formula II-D are in turn provided by effecting the equilibration reactions of equations 5-7 in the presence of reactant (c) instead of reactants (a) and/or (e), as illustrated by the following modification of equation 5.

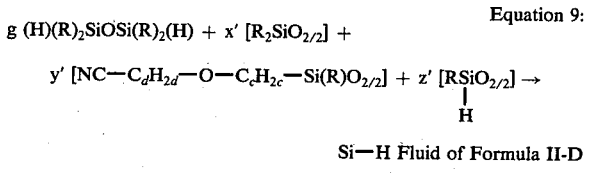

Equation 9:

Si—H Fluid of Formula II-D

In the copolymers encompassed by Formula VI-A in which z is two, the Si-H reactants employed to provide such copolymers will contain no Z° units [(H)(R)SiO$_{2/2}$] and are prepared by effecting the reaction of equation 9 in the absence of reactant (h).

In providing the Si-H fluids by the one-step reactions of equations 5 to 9, standard base-catalyzed equilibration reaction conditions are not suitable in view of the base-sensitivity of the Si—H groups. Therefore, the equilibration reactions of equations 5 to 9 are promoted by acid catalysts. Suitable catalysts for this purpose are trifluoromethylsulfonic acid (CF$_3$SO$_3$H) and concentrated (93-98 weight percent) sulfuric acid. The catalyst is usually employed in a concentration of from about 0.1 to about four weight percent, based on the total weight of reactants. The acid-catalyzed equilibration reactions are usually carried out with vigorous mechanical stirring at temperatures within the range from about 20° C. to about 120° C. at least until the reaction mixture becomes homogeneous. Effecting the reaction at temperatures from about 20° C. to about 50° C. usually provides a satisfactory rate of reaction. After completion of the reaction, the reaction product is neutralized with base such as sodium bicarbonate and filtered, sometimes adding a liquid hydrocarbon such as xylene or toluene or a filter aid to facilitate the filtration. When a diluent is used, it is conveniently separated from the reaction product by rotary vacuum evaporation.

In addition to the one-step reactions of equations 5 to 9, the cyanoalkoxyalkyl-polyalkylsiloxane hydrides encompassed by general Formulas II and II-A may also be prepared in step-wise manner. For example, the overall reaction of equation 5 may be effected by the following sequence of reactions:

Equation 5a:

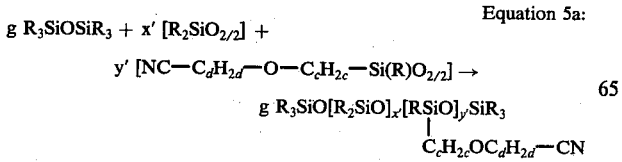

Equation 5b:

Product of Equation 5a + z' [RSiO$_{2/2}$] →
|
H

Si—H Fluid of Formula II-B

In view of the fact that the Si—H reactant is not used in the reaction of equation 5a, it may be effected in the presence of conventional alkaline equilibration catalysts useful in the preparation of unmodified polyalkylsiloxanes. Illustrative of such alkaline catalysts are potassium silanolate, cesium hydroxide and tetramethyl ammonium silanolate. Such promoters are usually employed in concentrations of from about 30 to about 50 p.p.m., based on the total weight of reactants. The temperature at which the base-catalyzed equilibration reaction of equation 5a is carried out depends largely on the catalyst employed. Thus, when tetramethyl ammonium silanolate is used, suitable reaction temperatures are from about 75° C. to about 100° C., preferably from about 80° C. to about 90° C. The other alkaline catalysts usually require higher temperatures such as from about 150° C. to about 200° C. The further reaction of the product of equation 5a to introduce the RSiO$_{2/2}$
|
H units, as shown by equation 5b, is carried out in the presence of an acid equilibration catalyst as described with spcific reference to the reactions of equations 5 to 9.

A third route to the cyanoalkoxyalkyl-polyalkylsiloxane hydrides encompassed by Formula II-B comprises the use of the monoelefinic cyanoalkyl ethers described above as reactant (i), as the source of the cyanoalkoxyalkyl groups, as illustrated by the following sequence of reactions wherein allyl 2-cyanoethyl ether is shown as the cyanobearing ether reactant:

Equation 10a:

g R$_3$SiOSiR$_3$ + x' [R$_2$SiO$_{2/2}$] + y' [RSiO$_{2/2}$] →
|
H g R$_3$SiO[R$_2$SiO]$_x$[RSiO]$_y$SiR$_3$
|
H

Equation 10b:

g R$_3$SiO[R$_2$SiO]$_x$[RSiO]$_y$SiR$_3$ +
|
H y' CH$_2$=CHCH$_2$—O—CH$_2$CH$_2$CN → g R$_3$SiO[R$_2$SiO]$_x$[RSiO]$_y$SiR$_3$
|
C$_3$H$_6$OCH$_2$CH$_2$CN

Equation 10c:

g R$_3$SiO[R$_2$SiO]$_x$[RSiO]$_y$SiR$_3$ + z' [RSiO$_{2/2}$] →
| |
C$_3$H$_6$OCH$_2$CH$_2$CN H

R$_3$SiO[R$_2$SiO]$_x$[RSiO]$_y$[RSiO]$_z$SiR$_3$
| |
C$_3$H$_6$ H
|
OCH$_2$CH$_2$CN

The reaction of equation 10a is effected in the presence of acid equilibration catalysts such as trifluoromethylsulfonic acid and sulfuric acid, at temperatures usually from about 20° C. to about 50° C. The reaction of equation 10b is platinum-catalyzed and is effected under the conditions described with specific reference to the hydrosilation reactions shown, for example, by equation 1. The reaction of equation 10c is acid-catalyzed and is carried out under the conditions described with reference to equations 5 to 9, employing an acid equilibration catalyst. Prior to the further reaction of the intermediate fluid provided by equation 10b, however, it is desirable to separate any unreacted allyl cyanoalkyl ether or isomerized derivatives thereof, in order to minimize any tendency of such compounds to react with the acid catalyst employed in the reaction of equation 10c. It is to be understood that, instead of introducing the

units in two stages (equations 10a and 10c), such units may be introduced during the reaction of equation 10a in a predetermined amount sufficient to provide the total desired amount $(y'+z')$ followed by partial reaction of the Si—H groups with $y'$ moles of the monoolefinic cyanoalkyl ether reactant. This latter embodiment is illustrated by the hydrosilation reaction of equation 3a above.

With further reference to general Formulas II and II-A, it is evident that when $t$ through $w$ are zero and Q is cyanoalkoxyalcosy, the Si—H fluids have the average composition depicted by the following Formula II-E,

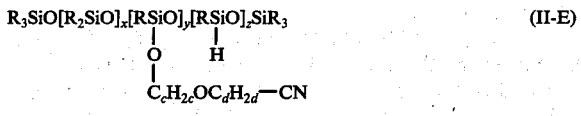

wherein R, c, d, x, y and z are also as summarized with specific reference to Formula II-B. Such Si—H fluids are prepared by methods which comprise the condensation of silanic hydrogen and hydrogen of the HO—C groups of the hydroxyalkyl cyanoalkyl ethers, HO—$C_cH_{2c}$—O—$C_d$—$H_{2d}$—CN, described above as reactant (j), as the source of the cyanoalkoxyalkoxy groups. One such method is as illustrated by the reaction of equation 4a, which as previously described herein, is usually promoted by catalysts comprising tin such as stannous octoate. By way of specific illustration, cyanoethoxypropoxy-substituted polymethylsiloxane hydrides having the average composition:

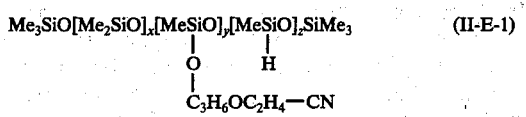

are provided by the reaction of the following equation 11 employing 3-hydroxypropyl 2-cyanoethyl ether as the source of the 3-(2-cyanoethoxy)propoxy groups:

Equation 11:

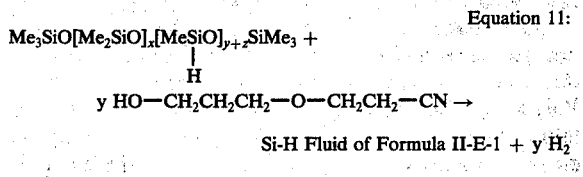

Si-H Fluid of Formula II-E-1 + $y$ 

The reaction of equation 11 is carried out in the presence of the metal catalysts, preferably tin carboxylates such as stannous octoate, as described, for example, with specific reference to the reaction of equation 2.

The Si-H fluids having Formula II-E-1 are useful in providing the polysiloxane-polyoxyalkylene block copolymers encompassed by Formulas X and XI by the respective hydrosilation and hydrogen condensation reactions of equations 1 and 2 employing, as the polyether reactants, the above-described allyl endblocked and hydroxyl-terminated poly(oxyethylene-oxypropylene) ethers, $GO(C_2H_4O)_n(C_3H_6O)_mCH_2CH=CH_2$ and $GO(C_2H_4O)_n(C_3H_6O)_m$—H, respectively.

The cyanoalkoxyalkyl- and cyanoalkoxyalkoxy-substituted polyalkylsiloxane hydrides having the average composition expressed by Formula II (including Formulas II-A through II-E) are described and claimed in our copending application Ser. No. 536,874, filed concurrently herewith, entitled "Cyano-Ether Polyalkylsiloxane Hydrides," now U.S. Pat. No. 3,943,156, granted Mar. 9, 1976.

The cyanoalkoxyalkyl- and cyanoalkoxyalkoxy siloxane-polyoxyalkylene copolymers encompassed by Formula I and the corresponding Si—H fluids encompassed by Formula II, are normally liquid compositions and, as previously described, comprise mixtures of polymer species which differ in molecular weight, polyether and siloxane contents and relative number of monomeric units. It is to be understood that two or more block copolymers or two or more Si—H fluids having a particular average composition encompassed by respective Formulas I and II may be admixed in suitable relative proportions to adjust the average values of $x$, $y$ and $z$, as desired. For example, a block copolymer wherein $y$ has an average value of about 45 may be admixed with about an equimolar proportion of another composition wherein $y$ has an average value of about 15 to provide a copolymer wherein $y$ has an average value of about 30. It is also to be understood that a small percentage (on the average, usually about 15 mole percent or less) of the polyoxyalkylene blocks of the copolymers of the invention may comprise residual, uncapped hydroxyl-terminated groups introduced with the polyoxyalkylene ether reactants.

The novel cyanoalkoxyalkyl- and cyanoalkoxyalkoxy-substituted siloxane-polyoxyalkylene copolymers of this invention are effective as stabilizers of flexible polyether urethane foams and can, therefore, be used as such without the need for combination with other surfactants, or other type of organic additive. The polymers can be employed as a 100 percent active stream, or they can be employed in dilute form as a solution in various types of organic liquids including non polar and polar solvents. For example, the polymers may be diluted with non polar solvents such as the normally liquid aliphatic and aromatic unsubstituted and halogen-substituted hydrocarbons such as heptane, xylene, toluene, chlorobenzene and the like. When used, the preferred diluents are poly(oxyalkylene) compounds encompassed by the formula:

$$DO(D'O)_rD''$$

wherein:
D is hydrogen or a monovalent hydrocarbon group including alkyl (e.g., methyl, ethyl, propyl and butyl), aryl (e.g., phenyl and tolyl) and aralkyl (e.g., benzyl) groups;

D' is a bivalent alkylene group (e.g., ethylene, propylene, trimethylene and butylene);

D" is a monovalent hydrocarbon group such as defined for D; and $t°$ has an average value of at least two.

When D is hydrogen, it is preferred that such DO— (that is, hydroxyl) groups constitute no more than about 5 weight percent of the solvent. Generally suitable solvents are alkylene oxide adducts of starters such as water, mono-ols, diols and other polyols, of which the organic starters are preferred. Such organic starters are typically illustrated by butanol, propylene glycol, glycerol and 1,2,6-hexanetriol. Preferred adducts of the organic starters are the mixed alkylene oxide adducts, particularly those containing a combination of oxyethylene and oxypropylene units. For example, one class of such organic solvents which may be present in combination with the copolymers of this invention are mixed ethylene oxide-propylene oxide adducts of butanol having the general formula, $HO(C_2H_4O)_{u°}(C_3H_6O)_{v°}C_4H_9$, wherein $u°$ has an average value from about 8 to about 50, and $v°$ has an average value from about 6 to about 40. Preferably, the values of $u°$ and $v°$ are such that the weight percent of oxyethylene units is substantially the same as the weight percent of the oxypropylene units.

When used, the aforesaid diluents are usually present in the solution compositions of this invention in an amount from about one to about 60, and more usually from about 5 to about 45, weight percent, based on the total weight of the cyanoalkoxyalkyl- and/or cyanoalkoxyalkoxy-substituted siloxane-polyoxyalkylene copolymer contained in the solution. It is to be understood, however, that such solutions may have higher contents of diluent and that the extent of dilution, if any, depends largely on the activity specifications of any given foam formulation.

The cyano-bearing organosilicone polymer surfactants of the present invention may also be used in combination with non ionic organic surfactants such as adducts produced by reacting $k$ moles of ethylene oxide (wherein $k$ has an average value from about 4 to about 40, inclusive of whole and fractional numbers) per mole of any of the following hydrophobes: n-undecyl alcohol, myristyl alcohol, lauryl alcohol, trimethyl nonanol, tridecyl alcohol, pentadecyl alcohol, cetyl alcohol, nonylphenol, dodecylphenol, tetradecylphenol and the like. Especially useful are ethylene oxide adducts of nonylphenol having the average composition, $C_9H_{19}$—$C_6H_4$—$(OC_2H_4)_hOH$, wherein $h$ has an average value from about 9 up to about 20 or more, including whole and fractional numbers such as 9, 10.5, 13, 14.5 and 15. When used, such non ionic organic surfactants are used in amounts from about 2 to about 20 weight percent, based on the total weight of the cyano-bearing block copolymer. It is to be understood that such additives may also be present as a component of the aforementioned solutions of the block copolymers.

Also included within the scope of this invention are compositions comprising the cyano-substituted polysiloxane-poloxyalkylene copolymers described herein in combination with other types of silicon-containing surfactants in which he polyoxyalkylene content is constituted of between about 20 and about 75 weight percent of oxyethylene units. Illustrative of such auxiliary surfactants are those in which the backbone of the siloxane blocks is substituted only with silicon-bonded methyl or other alkyl groups such as, for example, the block copolymers described in Reissue Pat. No. 27,541. Other organosilicones which can be used in combination with the surfactants of this invention are those wherein the siloxane backbone is substituted with a combination of alkyl (for example, methyl) and aralkyl groups (for example, phenylethyl) such as the block copolymers described in U.S. Pat. Nos. 3,657,305 and 3,686,254. Illustrative of further organosilicones with which the polymers of this invention may be used in combination are those wherein the polysiloxane block is substituted with methyl only and the polysiloxane and polyoxyalkylene blocks are linked by an Si—O—C linkage such as, for example, the compositions described in U.S. Pat. No. 2,834,748. Especially suitable as the additional copolymer are polymethylsiloxane-poly(oxyethylene-oxypropylene) block copolymers wherein the said poly(oxyethylene-oxypropylene) blocks are composed of an admixture of: (1) from about 50 to about 95 weight percent of low molecular weight Poly(oxyethylene-oxypropylene) copolymers having an average molecular weight from about 800 to about 3000 and wherein from about 20 to about 75 weight percent of the oxyalkylene groups are oxyethylene; and (2) from about 50 to about 5 weight percent of a higher molecular weight poly(oxyethylene-oxypropylene) copolymer having an average molecular weight from about 1600 to about 6000 and wherein from about 20 to about 75 weight percent of the oxyalkylene groups are oxyethylene; the said admixutre of (1) and (2) having an average molecular weight no higher than about 6000.

When used, the additional organosilicone polymer may be in combination with the cyano-bearing copolymers of this invention in an amount from about 1 to about 80 weight percent, and usually in a minor amount (that is, less than 50 weight percent), based on the combined weight of the cyano-bearing copolymers of the invention and the additional copolymer contained in the admixtures thereof.

In addition to the cyanoalkoxyalkyl- and cyanoalkoxyalkoxy-substituted polysiloxane-polyoxyalkylene copolymers of the invention, the other essential types of components and reactants employed in providing flexible polyurethane foams as described herein are polyether polyols, organic polyisocyanates, the catalyst system and blowing agent, and, when producing flame-retarded foam, the foam-producing reaction mixture also contains a flame-retardant. The cyano-substituted foam-stabilizing copolymers of the present invention are usually present in the final foam-producing reaction mixtures in an amount from about 0.1 to about 5 parts by weight per 100 parts by weight of the polyether polyol reactant.

In producing the flexible polyurethane polymers of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Among the suitable polyether polyols that can be employed are the poly(oxyalkylene) polyols, that is, alkylene oxide adducts of water or a polyhydric organic compound as the initiator or starter. For convenience, this class of polyether polyols is referred to herein as Polyol I. Illustrative of suitable polyhydric organic initiators are any one of the following which may be employed individually or in combination: ethylene glycol; diethylene glycol; propylene glycol; 1,5-pentanediol; hexylene glycol; dipropylene glycol; triethylene glycol; 1,2-cyclohexanediol; 3-cyclohexene-1,1-dimethanol and the 3,4-dibromo-derivative thereof; glycerol; 1,2,6-hexanetriol; 1,1,1-trimethylolethane; 1,1,1-trimethylolpropane; 3-(2-hydroxyethoxy)- and 3-(2-hydroxypropoxy)-1,2-propanediols; 2,4-dimethyl-2-(2-hydroxyethoxy)methylpentanediol-1,5; 1,1,1-tris[(2-hydroxyethoxy)methyl]ethane; 1,1,1-tris[(2-hydroxypropoxy)methyl]propane; pentaerythritol; sorbitol; sucrose; alpha-methyl glucoside; other such polyhydric compounds consisting of carbon, hydrogen and oxygen and having usually not more than about 15 carbon atoms per molecule; and lower alkylene oxide adducts of any of the aforesaid initiators such as propylene oxide or ethylene oxide adducts having a relatively low average molecular weight up to about 800.

The above-described polyether polyols are normally liquid materials and, in general, are prepared in accordance with well known techniques comprising the reaction of the polyhydric starter and an alkylene oxide in the presence of an oxyalkylation catalyst which is usually an alkali metal hydroxide such as, in particular, potassium hydroxide. The oxyalkylation of the polyhydric initiator is carried out at temperatures ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein
OH = hydroxyl number of the polyol,
$f$ = average functionality, that is, the average number of hydroxyl groups per molecule of polyol, and
M.W. = average molecular weight of the polyol.

The alkylene oxides usually employed in providing the polyether polyol reactants are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyether polyols that are suitable for use in preparing the flexible polyurethane foams of the present invention are polymer/polyether polyols which, for convenience, are referred to herein as Polyol II. Such reactants are produced by polymerizing one or more ethylenically unsaturated monomers dissolved or dispersed in a polyether polyol in the presence of a free radical catalyst. Suitable polyether polyols for producing such compositions include, for example, any of the above-described polyols encompassed by the definition of Polyol I. Illustrative of suitable ethylenically unsaturated monomers are those encompassed by the general formula,

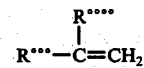

where: R°°° is hydrogen, methyl or any of the halogens (i.e., fluorine, chlorine, bromine or iodine); and R°°°° is R°°°, cyano, phenyl, methyl-substituted phenyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, and butadiene. These and other polymer/polyol compositions which are suitably employed either individually or in combination with Polyol I are those described in British Pat. No. 1,063,222 and U.S. Pat. No. 3,383,351, the disclosures of which are incorporated herein by reference thereto. Such compositions are prepared by polymerizing the monomers in the polyol at a temperature between about 40° C. and about 150° C. employing any free radical-generating initiator including peroxides, persulfates, percarbonates, perborates, azo compounds such as, for example, hydrogen peroxide, dibenzoyl peroxide, benzoyl hydroperoxide, lauroyl peroxide, and azobis(isobutyronitrile). The polymer/polyether polyol product may also contain a small amount of unreacted polyether, monomer and free polymer.

When used in the practice of this invention, the polymer/polyol compositions usually contain from about 5 to about 50, and more usually from about 10 to about 40, weight percent of the ethylenically unsaturated monomer polymerized in the polyether polyol. Especially suitable polymer/polyols are those containing:

A. from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of (1) and (2), respectively; and B. from about 90 to about 70 weight percent of the polyether polyol, and particularly trifunctional polyols such as alkylene oxide adducts of glycerol.

In preparing polyurethane foams in accordance with the present invention, it is to be understood that mixtures of any of the aforesaid polyether polyols encompassed by Polyol I and Polyol II can be employed as reactants with the organic polyisocyanate. The particular polyether polyol or polyols employed depends upon the end-use of the polyurethane foam. Usually diols provide soft foams. Firmer foams are obtained by the incorporation of polyether polyols having more than two hydroxyl groups, including triols, tetraols, pentols and hexols. When it is desired to produce polyurethanes having comparatively high load-bearing properties and/or diecutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 28 to about 150, and is usually no higher than about 80.

The polyisocyanates used in the manufacture of polyurethanes are known to the art and any such reactants are suitably employed in producing the flexible polyether-based polyurethane foams of the present invention. Among such suitable polyisocyanates are those represented by the general formula, Q'(NCO)$_i$ wherein: $i$ has an average value of at least two and is usually no more than six, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of suitable organic polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4-isocyanatophenyl)methane; 4-methoxy-1,4-phenylenediisocyanate; 4-chloro-1,3-phenylenediisocyanate; 4-bromo-1,3-phenylenediisocyanate, 5,6-dimethyl-1,3-phenylenediisocyanate; the isomeric tolylene diisocyanates such as 2,4-tolylene diisocyanate, 2,6-tolylene diisocyanate and mixtures thereof; crude tolylene diisocyanates; 6-isopropyl-1,3-phenylenediisocyanate; durylene diisocyanate; triphenylmethane-4,4',4''-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula,

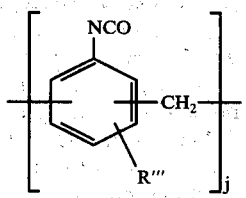

wherein R''' is hydrogen and/or lower alkyl and $j$ has an average value of at least 2.1. Preferably the lower alkyl radical is methyl and $j$ has an average value of from 2.1 to about 3.0. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially (e.g., NIAX Isocyanate AFPI), and are low viscosity (50-500 centipoises at 25° C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing moe than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyether polyol and organic polyisocyanate usually constitute the major proportion by weight of the polyurethane-forming reaction mixture. In general, the polyisocyanate and polyether polyol reactants are employed in relative amounts such that the ratio of total —NCO equivalents to total active hydrogen equivalent (of the polyether polyol and any water, when used) is from 0.8 to 1.5, preferably from 0.9 to 1.1, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 90 to about 110.

The urethane-forming reaction is effected in the presence of a minor amount of a catalyst comprising an amine. This component of the polyurethane-forming reaction mixture is usually a tertiary-amine. Suitable amine catalysts include one or more of the following: N-methylmorpholine; N-ethylmorpholine; N-octadecylmorpholine; triethylamine; tributylamine, trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the beta-tertiary amino amides and esters described in U.S. Pat. No. 3,821,131, as exemplified by 3-(N,N-dimethylamino)-N',N'-dimethylpropionamide.

Also useful as the amine catalyst are the beta-tertiary-amino nitriles described in copending application Ser. No. 369,556, filed June 13, 1973, of W. R. Rosemund, M. R. Sandner and D. J. Trecker, (now U.S. Pat. No. 3,925,268) such as, in particular, 3-(N,N-dimethylamino)-propionitrile as such or in combination with other tertiary amines such as bis[2-(N,N-dimethylamino)ether. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of the polyether polyol reactant.

In producing polyurethanes from polyether polyols usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichlorofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. The generally preferred method of foaming for producing flexible foams is the use of water or a combination of water plus a fluorocarbon blowing agent such as trichlorofluoromethane.

The amount of blowing agent employed will vary with factors such as the desired density of the foamed product. Usually, however, from about 1 to about 30 parts by weight of the blowing agent per 100 parts by weight of the polyether polyol reactant is preferred. Foam densities may be within the range from about 0.8 to about 5 pounds per cubic foot (pcf). Polyurethane foam of relatively low density such as 2 pcf and less is usually prepared employing blowing agent comprising water in an amount of at least about 3 parts by weight per 100 parts by weight of polyether polyol reactant, whereas higher density foam is provided at lower levels of water with and without the use of an auxiliary fluorocarbon blowing agent. It is to be understood, however, that these are general guidelines and that the choice of the particular amount of blowing agent employed to obtain a desired foam density specification varies from formulation to formulation and is well within the skill of the art to which the present invention pertains.

The flame-retardants that can be employed in producing flame-retarded flexible polyether foams in accordance with the teachings of this invention can be chemically combined in one or more of the other materials used (e.g., in the polyether polyol or polyisocyanate), or they can be used as discrete chemical compounds added as such to the foam formulation. The organic flame-retardants preferably contain phosphorus or halogen, or both phosphorus and halogen. Usually, the halogen, when present, is chlorine and/or bromine. Flame-retardants of the discrete chemical variety include: 2,2-bis(bromomethyl)-1,3-propanediol (also known as dibromoneopentyl glycol); 2,3-dibromopropanol, tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris(2,3-dibromopropyl)phosphate; tris(2,3-dichloropropyl)phosphate; tris(1-bromo-3-chloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate; and O.O-diethyl-N,N-bis(2-hydroxyethyl)aminomethyl phosphonate. Also suitable are compounds having the formulas:

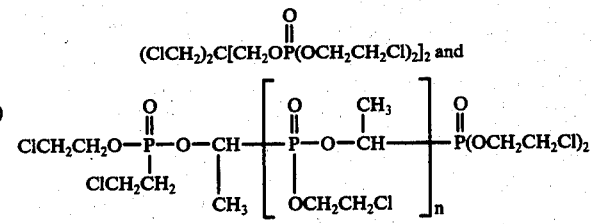

which are availabe from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesiad compounds may be employed individually or in combination with one another.

Those of the above flame-retardants of the discrete chemical compound variety which contain groups reactive with hydroxyl or isocyanate groups can be used as reactants in producing the polyether polyol reactant or they can be reacted with organic polyisocyanates, to produce modified polyols or polyisocyanates having chemically combined flame-retarding groups. Such modified polyether polyols and polyisocyanates are also useful as reactants in the process of this invention. In such cases, due regard must be given to the possible effect of the functionality of the compound on the other properties (e.d., degree of flexibility) of the resulting foam.

The flame-retarding agent can be used in an amount from about 1 to about 30 parts by weight per 100 parts by weight of the polyether polyol reactant, and is usually employed in an amount of at least about 5 parts by weight. It is evident that the particular amount of flame-retardant employed depends largely on the efficiency of any given agent in reducing flammbility.

The polyether-based polyurethane foams of this invention may be formed in accordance with any of the processing techniques known to the art such as, in particular, the "one-shot" technique. In accoordance with this method, foamed products are provided by carrying out the reaction of the polyisocyanate and polyether polyol simultaneously with the foaming operation. It is sometimes convenient to add the foam stabilizing component comprising the cyanoalkoxyalkyl and/or cyanoalkoxyalkoxy-substituted polyalkylsiloxane polyoxyalkylene copolymers of the present invention to the reaction mixture as a premixture with one or more of the blowing agent, polyether polyol, amine catalyst and, when used, the flame-retardant. It is to be understood that the relative amount of the various components of the foam formulations are not narrowly critical. The polyether polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine cataylst, metal co-catalysts and the foam stabilizing admixtures of the present invention are each present in a minor amount necessary to achieve the function of the component. Thus, the blowing agent is present in an amount sufficient to form the reaction mixture, the amine catalyst is present in a catalytic amount (i.e., an amount sufficient to catalyze the reaction to produce the urethane at a reasonable rate), and the cyano-bearing organosilicone polymers of this invention are present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as fillers, dyes, pigments, anti-yellowing agents and the like. The polyurethanes produced in accordance with the present invention are used in the same areas as conventional flexible polyether polyurethanes and are especially useful where improved fire-resistance properties are beneficial. Thus, the foams of the present invention are used with advantage in the manufacture of textile interliners, cushions, mattresses, paddings carpet underlay, packaging, gaskets, sealers, thermal insulators and the like.

The following examples are merely illustrative of the present invention and are not intended as a limitation upon the scope thereof.

It is to be understood that in the formulas included in the data which follows, "Me" designates a methyl group, —CH$_3$.

In the following Examples 1-8, illustrative copolymers of the invention were prepared by the following methods:

1. Hydrosilation of allyl-endblocked polyethers with 3-(2-cyanoethoxy)propyl-substituted polymethylsiloxane hydrides having the average composition,

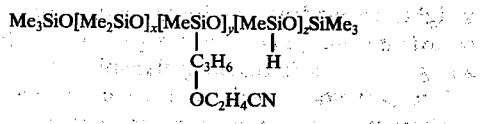

where Me is methyl and x, y and z have average values within the ranges previously defined herein; and 2. Hydrosilation of the allyl-endblocked polyether reactant and allyl 2-cyanoethyl ether with polymethylsiloxane hydrides having the average composition:

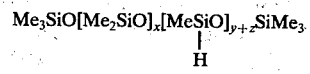

wherein the sum $y+z$ corresponds to the combined number of Y and Z units desired in the final polymeric composition for every two moles of M units.

As expressed in the examples, the values given for the found weight percentages of Me(H)SiO content of the various siloxane hydrides (referred to for brevity as "Si-H Fluids") are derived from Si—H analyses thereof (cc. H$_2$ per gram of fluid) in accordance with the conversion:

$$\text{Weight Percent Me(H)SiO Found} = \frac{\text{cc. H}_2 \text{ per gram} \times 100}{373.3}$$

where the factor 373.3 is the theoretical number of cubic centimeters of hydrogen provided per gram of fluid consisting of 100 percent Me(H)SiO (that is, 22,400 cc. of hydrogen divided by the unit molecular weight of 60). The theoretical percentages of Me(H)SiO correspond to the calculated weight [60 (z) or 60 (x+z)] contributed by Me(H)SiO divided by the calculated total molecular weight of the fluid product times 100.

In preparing Surfactants A through H as described in accordance with the following Examples 1-8, respectively, the polyether reactants employed were allyl alcohol-started poly(oxythylene-oxypropylene) ethers capped with a methyl group, containing a small percentage (up to about 10 mole per cent) of hydroxy-terminated polyester chains due to incomplete methyl capping of the allyl-endblocked polyether intermediate. For convenience the particular reactants employed are designated as Polyethers A and B and have the respective average compositions given in Table I:

TABLE I

POLYETHER REACTANTS

General Formula: MeO(C$_3$H$_6$O)$_m$(C$_2$H$_4$O)$_n$CH$_2$CH=CH$_2$

| Polyether | Allyl Analysis[1] | Molecular Weight[2] | m | n |
|-----------|-------------------|---------------------|------|------|
| A | 1.42 | 2887[3] | 28.1 | 26.9 |
| B | 1.38 | 2971[4] | 30 | 26.4 |

[1]Weight Percent.
[2]Based on allyl analysis.
[3]Oxyethylene content = about 42 weight percent.
[4]Oxyethylene content = about 40 weight percent.

EXAMPLE 1

PREPARATION OF SURFACTANT A

A. Preparation of Si-H Fluid I

To a one-liter capacity three-necked flask fitted witn a mechanical stirrer, water cooled condenser, and source of nitrogen, the following reactants were added:

1. Trimethylsiloxy-endblocked dimethylsiloxy trimer, Me$_3$SiO(Me$_2$SiO)$_3$SiMe$_3$ is an amount of 19.2 grams, corresponding to 0.1 mole of Me$_3$SiO$_{1/2}$ and 0.15 mole of Me$_2$SiO$_{2/2}$;

2. Polymeric methylsiloxy hydride in an amount of 75.0 grams, corresponding to 1.25 moles of Me(H)SiO$_{2/2}$;

3. Cyclic dimethylsiloxane tetramer in an amount of 210.9 grams, corresponding to 2.85 moles of $Me_2SiO_{2/2}$; and 4. Trifluoromethylsulfonic acid catalyst in an amount corresponding to 0.2 weight percent, based on the total weight of reactants (1)–(3). After 2 hours of stirring under nitrogen, the reaction mixture was homogeneous. The equilibration reaction was stirred for an additional five hours and was then neutralized with 50 grams of sodium bicarbonate, heated to 130° C., sparged with nitrogen, cooled and filtered. Based upon the relative proportions of reactants (2)–(3), normalised on the basis of two moles of $Me_3SiO_{1/2}$, the nominal average composition of the resulting polymethylsiloxane hydride is:

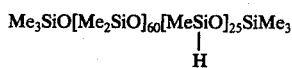

and the theoretical weight percent of Me(H)SiO is 24.58. Analysis of the product for silanic hydrogen provided 88.09 cc. $H_2$/gram, corresponding to a found Me(H)SiO content of 23.6 weight percent. Based upon the Si—H analysis the average composition of the product is,

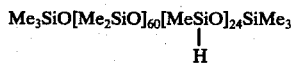

and is referred to herein as Si—H Fluid I.

B. Preparation of Surfactant A

The above-described Si-H Fluid I (30.21 grams, 0.119 moles Me(H)SiO) was reacted with allyl 2-cyanoethyl ether (10.0 grams, 0.090 moles) in xylene solvent (50 grams) in the presence of 10 p.p.m. Pt catalyst added as chloroplatinic acid at a temperature of 80° C. for about 1 hour. The resultant 3-(2-cyanoethoxy)propyl-modified Si-H fluid.

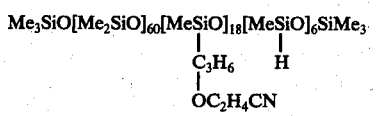

was then combined with Polyether A (110 grams, 0.0381 mole, the stoichiometric amount being 0.029 moles). The mixture was heated to about 90° C. and while at that temperature 10 p.p.m. of Pt catalyst was added. The reaction mixture was heated at 95° C. until essentially complete as indicated by a residual Si—H content (standard fermentation tube technique involving the use of KOH—$C_2H_5OH$—$H_2O$) of 0.2 cc. $H_2$ per 2 ml. sample of product. The reaction mixture was cooled to room temperature, neutralized with sodium bicarbonate, filtered and stripped of solvent by rotary vacuum evaporation (about 50° C./5mm.). The liquid reaction product had a Brookfield viscosity (at 25° C.) of 1200 centipoise, and is designated herein as Surfactant A. Based upon the relative proportions of Si—H Fluid I, allyl cyanoethyl ether and stoichiometric amount of Polyether A, Surfactant A comprises a polymer having the average composition,

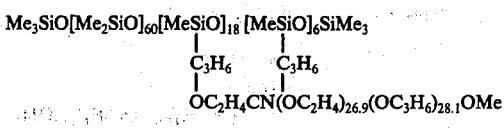

EXAMPLE 2

PREPARATION OF SURFACTANT B

A. Preparation of Si-H Fluid II

The equilibration reaction and procedure of part (A) of Example 1 was repeated employing reactants (1) and (2) as well as the trifluoromethylsulfonic acid catalyst in the same amounts, and reactant (3) in an amount of 173.9 grams corresponding to 2.35 moles of $Me_2SiO_{2/2}$. Based upon the relative proportions of reactants (1)–(3), normalized on the basis of two moles of $Me_3SiO_{1/2}$, the nominal average composition of the resulting polymethylsiloxane hydride is:

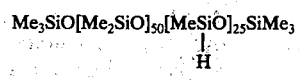

and the theoretical weight percent of Me(H)SiO is 27.97. Analysis of the product for silanic hydrogen provided 100.04 cc. $H_2$/gram, corresponding to a found Me(H)SiO content of 26.8 weight percent. Based upon the Si—H analysis, the average composition of the product, referred to herein as Si—H Fluid II, is

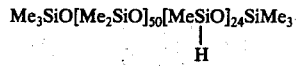

B. Preparation of Surfactant B

The above-described Si—H Fluid II (26.81 grams, 0.1198 moles MeHSiO) was reacted with allyl 2-cyanoethyl ether (9.99 grams, 0.0898 moles) in xylene solvent (50 grams) in the presence of 10 p.p.m. Pt catalyst and under the reaction conditions of part (B) of Example 1. The resultant 3-(2-cyanoethoxy)propyl-modified Si—H fluid has the average composition,

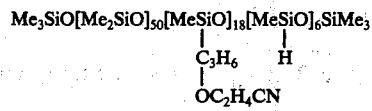

and was then combined with Polyether A (114 grams, 0.0394 mole, the stoichiometric amount required to react with said modified Si—H fluid being about 0.030 mole). The platinum catalyzed hydrosilation of the polyether reactant was effected under the reaction conditions of part (B) of Example 1, until the residual Si—H content of the mixture was 0.3 cc. $H_2/1$ cc. of product. After being similarly neutralized and stripped of solvent, the liquid reaction product had a Brookfield viscosity (at 25° C.) of 1080 centipoise, and is designated herein as Surfactant B. Based upon the relative proportions of Si—H Fluid II, allyl cyanoethyl ether and stoichiometric amount of Polyether A, Surfactant B comprises a polymer having the average composition,

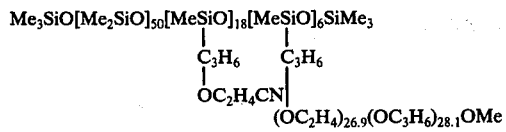

EXAMPLE 3

PREPARATION OF SURFACTANT C

A. Preparation of Si—H Fluid III

Equilibration of a reaction mixture containing the following reactants (1)–(3) was effected in the presence of trifluoromethylsulfonic acid catalyst (0.7 grams) employing the reaction conditions and procedure typically illustrated by part (A) of Example 1:

1. Hexamethyldisiloxane, $Me_3SiOSiMe_3$, in an amount of 8.1 grams (0.05 mole) corresponding to 0.1 mole of $Me_3SiO_{1/2}$;
2. Polymeric methylsiloxane hydride in an amount of 42.0 grams, corresponding to 0.7 mole of $Me(H)SiO_{2/2}$; and
3. Cyclic dimethylsiloxane tetramer in an amount of 240.5 grams, corresponding to 3.25 moles of $Me_2SiO_{2/2}$.

Based upon the relative proportions of reactants (1)–(3), normalized on the basis of two moles of $Me_3SiO_{1/2}$, the nominal average composition of the resulting polymethylsiloxane hydride is:

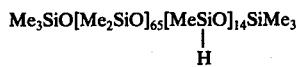

and the theoretical weight percent of Me(H)SiO is 14.45. As used in part (B) of this example, analysis of the product for silanic hydrogen provided 53.0 cc. $H_2$/gram, corresponding to a found Me(H)SiO content of 14.17 weight percent. Based upon the Si—H analysis, the product has the average composition

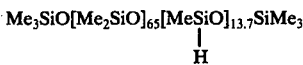

and is referred to as Si—H Fluid III.

B. Preparation of Surfactant C

A reaction mixture was prepared containing the following:
a. Si—H Fluid III in an amount of 25 grams (0.059 mole of MeHSiO);
b. Polyether B in an amount of 84.3 grams (0.0284 mole);
c. Allyl 2-cyanoethyl ether in an amount of 4.4 grams (0.0396 mole); and
d. Xylene solvent (100 ml.)

Based upon a stoichiometric reaction involving hydrosilation of reactants (b) and (c) in a mole ratio of 5:8.7, the respective amounts of the unsaturated reactants in excess of stoichiometry were about 31 mole percent for reactant (b) and about 5.8 mole percent for reactant (c). The reaction mixture was heated to 83° C. and was then catalyzed by the addition of 50 p.p.m. Pt catalyst, the addition of which raised the temperature to 97° C. The reaction mixture was held at 100° C. for a total reaction time of 2.75 hours during which time samples of the reaction mixture were analyzed for residual Si—H content. At the end of 1.75 hours of elapsed reaction time, an additional amount (about 8 weight percent of the initial charge) of reactants (b) and (c) was added. At the end of 2.5 hours of total elapsed reaction time, residual Si—H was 0.65 cc. $H_2$/2 cc. sample. The reaction mixture was then cooled, neutralized with sodium bicarbonate, filtered and stripped of solvent. The reaction product (112 grams) was a clear, dark liquid having a Brookfield viscosity (at 25° C.) of 870 centipoise, and is designated herein as Surfactant C. Based upon the average composition of Si—H Fluid III and the aforesaid stoichiometry, Surfactant C comprises a copolymer having the following average composition,

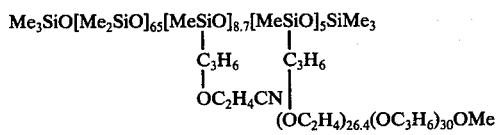

In addition to the hydrosilation of unsaturated reactants (b) and (c) proceeding concurrently at substantially the same reaction rate, the hydrosilation may also occur concurrently at different reaction rates or it may proceed to first hydrosilate substantially all of either reactant (b) or reactant (c) followed by reaction of remaining silanic hydrogen with the other of the unsaturated reactants. Irrespective of the relative rates of reaction, however, the average composition of Surfactant C is within the scope of the polymers provided by the present invention. Thus, if the relative rates of reaction between silanic hydrogen of reactant (a) and respective reactants (b) and (c) are such that the desired stoichiometry was not achieved, the average number of the 3-(2-cyanoethoxy)propyl methylsiloxy Y units (that is, the value of $y$) contained in Surfactant C is within the range from about 7.1 to about 9.2, and the average number of the polyether-substituted Z units (that is, the value of $z$) is correspondingly within the range from about 6.6 to about 4.5. These limits of $y$ and $z$ are readily calculated. For example, hydrosilation of the total initial charge (0.0284 mole) of reactant (b) leaves 0.0306 mole of Si—H for reaction with (c) and thus the average value of $y$ is 7.1 [that is, 0.0306/0.059 times 13.7], and $z$ has a corresponding average value of 6.6. Likewise, hydrosilation of the total initial charge (0.0396) of reactant (c), provides a polymer composition in which the average value of $y$ is 9.2 [that is, 0.0396/0.059 times 13.7] and the corresponding average value of $z$ is 4.5. Partial hydrosilation of reactants (b) and (c) provides polymer products in which the average value of $y$ is intermediate 7.1 and 9.2 in which the corresponding value of $z$ is intermediate 6.6 and 4.5.

EXAMPLE 4

PREPARATION OF SURFACTANT D

A. Preparation of Si—H Fluid IV

To a one liter, three-necked flask equipped with a mechanical stirrer, condenser and nitrogen blow-by, the following reactants were added:

1. Hexamethyldisiloxane, $Me_3SiOSiMe_3$, in an amount of 16.2 grams (0.1 mole);
2. Polymeric methylsiloxane hydride in an amount of 120 grams, corresponding to 0.2 mole of $Me(H)SiO_{2/2}$; and
3. Cyclic dimethylsiloxane tetramer in an amount of 518 grams corresponding to 0.7 mole of $Me_2SiO_{2/2}$.

The mixture was equilibrated in the presence of trifluoromethylsulfonic acid catalyst (2 grams) for several days. The viscous reaction mixture was then sparged with nitrogen, stirred with sodium bicarbonate for about 3 hours, heated at 120° C. for several hours and filtered. Based upon the relative proportions of reactants (1)–(3) normalized on the basis of two moles of $Me_3SiO_{1/2}$, the nominal average composition of the polymethylsiloxane hydride is:

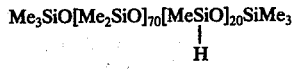

and the theoretical content of Me(H)SiO is 18.34 weight percent. As used in part (B) of this example, analysis of the product for silanic hydrogen provided 66.6 cc. $H_2$/gram, corresponding to a found Me(H)SiO content of 17.84 weight percent. Based upon the Si—H analysis, the product has the average composition,

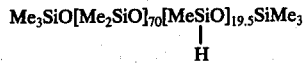

and is referred to herein as Si—H Fluid IV.

B. Preparation of Surfactant D

The purpose of this preparation was to react 70 mole percent of the silanic hydrogen of Si—H Fluid IV with allyl 2-cyanoethyl ether and the remaining 30 percent with Polyether B. To this end, allyl 2-cyanoethyl ether was used in a total amount (0.0542 moles) which included about a 5 mole percent excess over the desired stoichiometry and Polyether B was used in a total amount (0.0299 moles) which included about 35 mole percent excess.

A reaction mixture was prepared containing:

a. Si—H Fluid IV in an amount of 25 grams, corresponding to 0.074 mole of Me(H)SiO;

b. Polyether B in an amount of 80.9 grams (0.0272 mole);

c. Allyl 2-cyanoethyl ether in an amount of 5.4 grams (0.0488 mole); and d. Xylene (100 ml.).

After heating the reaction mixture to 84° C., 50 p.p.m. Pt catalyst was added. The reaction temperature rose to 100° C. and was maintained at 100° C. for 1.25 hours after which further catalyst (50 p.p.m.) was added. After a total reaction time of 3.4 hours, a further charge of Polyether B (8.0 grams; 0.0027 mole), allyl 2-cyanoethyl ether (0.6 gram; 0.0054 mole), xylene (10 ml.) and catalyst (0.08 ml.) was added to the reaction. The reaction mixture was then refluxed (143° C.) for 2 hours. The mixture was then cooled, neutralized, filtered and desolvated to provide a clear liquid product (106.5 grams), referred to herein as Surfactant D, having a Brookfield viscosity (at 25° C.) of 1380 centipoise. Analysis of the product showed about 85 percent reaction of the silanic hydrogen of Si—H Fluid IV. Based upon the average composition of Si—H Fluid IV and the aforesaid desired stoichiometry, Surfactant D comprises a copolymer having the following average composition,

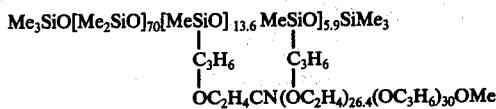

In the event the reaction between silanic hydrogen of reactant (a) with the unsaturated reactants occurred at other than the desired stoichiometry, the average number of 3-(2-cyanoethoxy)propyl methylsiloxy units contained in Surfactant D is within the range from about 11.6 to about 14.3, and the average number of polyether-methylsiloxy units is corresponding within the range from about 7.9 to about 5.2.

EXAMPLE 5

PREPARATION OF SURFACTANT E

The purpose of this preparation was to react 70 mole percent of the silanic hydrogen of Si—H Fluid IV prepared as described under part (A) of Example 4 above with allyl 2-cyanoethyl ether and the remaining 30 percent with Polyether B. To this end, the allyl 2-cyanoethyl ether was used in a total amount (0.0542 moles) which included about a 5 mole percent excess over the desired stoichiometry and Polyether B was used in a total amount (0.0299 moles) which included about 35 mole percent excess.

A reaction vessel was charged with Si—H Fluid IV in an amount of 25 grams, corresponding to 0.074 mole of Me(H)SiO, and 25 ml. of xylene. To this solution, there was then added dropwise over a two hour period, a mixture containing: (1) allyl 2-cyanoethyl ether (6.0 grams, 0.0542 mole); (2) Polyether B (68.3 grams, 0.023 mole); (3) 50 p.p.m. Pt catalyst; and 75 ml. of xylene. During the addition, the reaction temperature was maintained at 85° C. After about 20 minutes, an additional charge of Polyether B (20.5 grams, 0.0069 mole), Pt catalyst and xylene (10 ml.) was added dropwise over 0.75 hour. The reaction mixture was continued to be maintained at 85° C. for another hour after which the product was cooled, neutralized, filtered and stripped. The remaining liquid (111.5 grams) which is referred to herein as Surfactant E, was clear and had a Brookfield viscosity of 1460 centipoise. Analysis of the product showed that about 90 percent of silanic hydrogen of Si—H Fluid IV had been reacted. Surfactant E comprises a copolymer to which the average composition expressd above for Surfactant D is assigned.

EXAMPLE 6

PREPARATION OF SURFACTANT F

A. Preparation of Si—H Fluid V

Equilibration of a reaction mixture containing the following reactants (1)–(3) was effected in the presence of trifluoromethylsulfonic acid catalyst (1 gram) employing the reaction conditions and procedure typically illustrated by part (A) of Example 1:

1. Hexamethyldisiloxane, $Me_3SiOSiMe_3$, in an amount of 16.2 grams (0.1 mole);

2. Polymeric methylsiloxane hydride in an amount of 120.0 grams, corresponding to 2.0 moles of $Me(H)SiO_{2/2}$; and 3. Cyclic dimethylsiloxane tetramer in an amount of 370.0 grams, corresponding to 5.0 moles of $Me_2SiO_{2/2}$. Based upon the relative proportions of reactants (1)–(3), normalized on the basis of two mols of $Me_3SiO_{1/2}$, the nominal average composition of the resulting polymethylsiloxane hydride is:

$$\text{Me}_3\text{SiO}[\text{Me}_2\text{SiO}]_{50}[\underset{\underset{\text{H}}{|}}{\text{MeSiO}}]_{20}\text{SiMe}_3$$

and the theoretical weight percent of Me(H)SiO is about 23.7 weight percent. Inasmuch as analysis of this product provided 94.0 cc. H$_2$/gram corresponding to 25.2 weight percent Me(H)SiO, for the purpose of this example the composition of Si—H Fluid V is taken as expressed above.

B. Preparation of Surfactant F

In this preparation, the following reactants were employed:

a. Si—H Fluid V prepared in accordance with part (A) of this example, in an amount of 25 grams corresponding to 0.099 mole of Me(H)SiO2/2;

b. Allyl 2-cyanoethyl ether in an amount of 8.0 grams (0.072 mole) corresponding to the amount required to achieve a stoichiometric reaction with 72.5 mole percent of silanic hydrogen contained in reactant (a);

c. Polyether B in an amount of 80.8 grams (0.027 mole), corresponding to the minimum amount required to react with the remaining silanic hydrogen contained in reactant (a); and d. Polyether B in an additional amount of 24.2 grams, corresponding to about a 30 mole percent excess over the desired stoichiometric reaction.

In effecting the hydrosilation, reactants (a), (b) and (c) were combined with 100 ml. xylene and heated to 85° C. Platinum catalyst (50 p.p.m. Pt) as chloroplatinic acid in 20 ml. xylene was added dropwise over 0.5 hour. The reaction mixture exothermed to 98° C. After this initial reaction period, greater than 85 percent of Si—H had been consumed. The temperature was then held at 85° C. while a solution of reactant (d), Pt catalyst (50 p.p.m. Pt) and 20 ml. xylene was added dropwise over one hour. After this period, greater than 92.5 percent of silanic hydrogen had been consumed and thus the reaction was terminated. After neutralization, filtration and removal of solvent, the liquid product (132.5 grams) which is referred to herein as Surfactant F, had a viscosity of 1000 centipoise. Based upon the average nominal composition of Si—H Fluid V and the desired stoichiometry, Surfactant F comprises a polymer to which the following average composition is assigned, $$\text{Me}_3\text{SiO}[\text{Me}_2\text{SiO}]_{50}[\underset{\underset{\underset{\text{OC}_2\text{H}_4\text{CN}}{|}}{\text{C}_3\text{H}_6}}{|}}{\text{MeSiO}}]_{14.5}[\underset{\underset{\underset{(\text{OC}_2\text{H}_4)_{26.4}(\text{OC}_3\text{H}_6)_{30}\text{OMe}}{|}}{\text{C}_3\text{H}_6}}{|}}{\text{MeSiO}}]_{5.5}\text{SiMe}_3$$

EXAMPLE 7

PREPARATION OF SURFACTANTS G-1 and G-2

A. Preparation of Si—H Fluid VI

In this preparation, the reaction mixture contained:

1. Hexamethyldisiloxane, Me$_3$SiOSiMe$_3$, in an amount of 16.2 grams (0.1 mole);

2. Polymeric methylsiloxane hydride in an amount of 120 grams, corresponding to 2.0 moles of Me(H)SiO$_{2/2}$; and 3. Cyclic dimethylsiloxane tetramer in an amount of 444 grams corresponding to 6.0 moles of Me$_2$SiO$_{2/2}$.

The mixture was equilibrated in the presence of trifluoromethylsulfonic acid catalyst (2 grams) for several days while magnetically stirred. The mixture was then treated with sodium bicarbonate, mechanically stirred and sparged with nitrogen for 2 hours, and heated at 120° C. for about 4 hours while sparging which was continued overnight. The mixture was then filtered. Based upon the relative proportions of reactants (1)–(3), normalized on the basis of two moles of Me$_3$SiO$_{1/2}$, the nominal average composition of the resulting polymethylsiloxane hydride is, $$\text{Me}_3\text{SiO}[\text{Me}_2\text{SiO}]_{60}[\underset{\underset{\text{H}}{|}}{\text{MeSiO}}]_{20}\text{SiMe}_3$$

and the theoretical weight percent of Me(H)SiO is 20.66. Analysis of the product for silanic hydrogen provided 74.6 cc. H$_2$/gram corresponding to a found Me(H)SiO content of 19.98 weight percent. Based upon the Si—H analysis, the average composition of the product is $$\text{Me}_3\text{SiO}[\text{Me}_2\text{SiO}]_{60}[\underset{\underset{\text{H}}{|}}{\text{MeSiO}}]_{19.3}\text{SiMe}_3$$

B. Preparation of Surfactants G-1 and G-2

In these preparations, a reaction mixture containing the following was used:

a. Si—H Fluid VI prepared under part (A) of this example in an amount of 25 grams (0.0832 mole Me(H)SiO);

b. Polyether B (86.2 grams, 0.0290 mole);

c. Allyl 2-cyanoethyl ether (8.1 grams, 0.0728 mole); and d. Toluene (100 ml.)

Based upon the desired stoichiometric reaction which was to react (b) and (c) in a mole ratio of 5.3:14, the respective amounts of the unsaturated reactants in excess of stoichiometry were 27 mole percent of reactant (b) and about 30 mole percent of reactant (c). The reaction mixture was heated for 2 hours at 90° C. with stirring during which 100 p.p.m. Pt catalyst was added in three increments, namely, initially (50 p.p.m.), after 60 minutes (25 p.p.m.) and after 90 minutes (25 p.p.m.) of total reaction time. After 10 minutes of elapsed reaction time, the standard test for residual Si—H showed that greater than 96 percent had been consumed and after the two hour total reaction period, the reaction was essentially complete (greater than 97.5 percent Si—H consumed). The liquid product was then neutralized with sodium bicarbonate, filtered and desolvated by rotary evaporation. About one half of the total liquid product (121.5 grams) was vacuum-sparged with nitrogen. The sparged product had a Brookfield viscosity of 1980 centipoise, and is referred to herein as Surfactant G-1. The remaining product, recovered without sparging, had a viscosity of 1300 centipoise, and is referred to herein as Surfactant G-2. Based upon the average composition of Si—H Fluid VI and the aforesaid stoichiometry, Surfactants G-1 and G-2 comprise polymers having the following average composition,

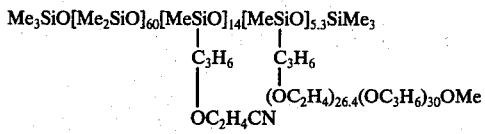

In the event the reaction between silanic hydrogen of reactant (a) with the unsaturated reactants occurred at other than the desired stoichiometry, the average number of 3-(2-cyanoethoxy)propyl methylsiloxy units contained in Surfactants G-1 and G-2 is within the range from about 12.6 to about 16.8 and the average number of the polyethermethylsiloxy units is correspondingly within the range from about 6.7 to about 2.5.

EXAMPLE 8

PREPARATION OF SURFACTANT H

The reaction of this example was carried out in a 500 liter, 3-necked flask equipped with magnetic stirrer, thermometer, nitrogen inlet and heating mantle to which the following were charged:

a. Si—H Fluid III prepared as described under part (A) of Example 3 above in an amount of 25 grams (0.059 mole Me(H)SiO);

b. Polyether B in an amount of 83.1 grams (0.028 mole);

c. Allyl 2-cyanoethyl ether in an amount of 5.0 grams (0.045 mole); and d. Toluene solvent (100 ml.).

Based upon a stoichiometric reaction involving hydrosilation of reactants (b) and (c) in a mole ratio of 5:8.7, the respective amounts of the unsaturated reactants in excess of stoichiometry were 30 mole percent of reactant (b) and 20 mole percent of reactant (c). The reaction mixture was heated for 1 hour at 90° C. with stirring during which time 100 p.p.m. Pt catalyst was added in four equal increments, namely, initially, and after 10, 30 and 40 minutes of elapsed reaction time. After 20 minutes of elapsed reaction time, the standard test for residual Si—H showed that greater than 98.5 percent had been consumed, and after 50 minutes of elapsed reaction time, the test for residual Si—H was negative. After cooling and neutralization with sodium bicarbonate (20 grams), the product was filtered and desolvated by rotary evaporation up to 50° C./1 mm. mercury pressure. The liquid reaction product (105.5 grams) had a Brookfield viscosity (at 25° C.) of 1360 centipoise, and is referred to herein as Surfactant H. Based upon the average composition of Si—H Fluid III and the aforesaid stoichiometry, Surfactant H comprises a copolymer having the following average composition,

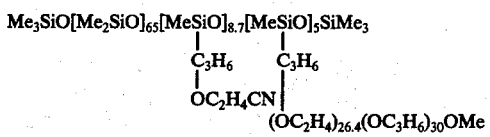

In the event the reaction between silanic hydrogen of reactant (a) with the unsaturated reactants occurred at other than the desired stoichiometry, the average number of 3-(2-cyanoethoxy)propyl methylsiloxy units contained in Surfactant H is within the range from about 7.2 to about 10.4, and the average number of polyether- methylsiloxy units is correspondingly within the range from about 6.5 to about 3.3.

In accordance with the following Examples 9 through 28, flexible polyether polyurethane foams were produced using the above-described Surfactants A through H of the present invention as the respective foam stabilizing surfactant component of the foam-producing reaction mixture, designated herein as Foam Formulation A, which had the following composition:

TABLE II

| FOAM FORMULATION A | |
|---|---|
| Component | Parts By Weight |
| Polyether Polyol having a hydroxyl number of 56 produced by reacting glycerol and propylene oxide | 100 |
| Tolylene Diisocyanate (Index 105)[1] | 49.73 |
| Tris(2-chloroethyl)phosphate | 10 |
| Water | 4 |
| Bis[2-(N,N-dimethylamino)ethyl] ether employed as a 70 weight per cent solution in dipropylene glycol | 0.1 |
| Stannous Octoate | 0.35 |
| Surfactant | Varied[2] |

[1]This component was a mixture of the 2,4- and 2,6- isomers of tolylene diisocyanate present in a weight ratio of 80:20, respectively. Index 105 designates that the amount of mixture employed was 105 weight percent of the stoichiometric amount required to react with total reactive hydrogens from the polyether polyol and water present in the foam formulation.
[2]For specific proportions employed, refer to Tables III-VII herein.

Foam Formulation A was also used as the reaction mixture for providing flexible polyether polyurethane foams stabilized with other surfactants, designated herein as Surfactants AA, BB and BB-1 which are not within the scope of the present invention. These particular surfactants are identified below:

Surfactant AA is a hydrolyzable polyoxyalkylenepolysiloxane block copolymer having the following average structure, wherein the polyoxyalkylene block is derived from a butanol-started, hydroxyl-terminated poly(oxyethyleneoxypropylene) ether:

and was employed in undiluated (that is, 100 percent active) form.

Surfactant BB is a polyoxyalkylene-polysiloxane block copolymer having the average composition,

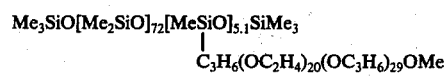

and was employed in undiluted or 100 percent active form.

Surfactant BB-1 is a solution containing 55 weight percent of Surfactant BB (that is, 55 weight percent active) and 45 weight percent of a solvent mixture consisting of 90 weight percent of the butanol-started polyether mono-ol having the average formula, $C_4H_9O(C_2H_4O)_{11}(C_3H_6O)_8H$, and 10 weight percent of an ethylene oxide adduct of nonylphenol having the average structure, $C_9H_{19}C_6H_4O(C_2H_4O)_{10.5}H$.

General Foaming Procedure

The manipulative steps involved in preparing the foams of Examples 9 to 28 as well as the other foam preparations described herein including the control foams, are as follows: After dispensing the polyether polyol in a container (Lily Cup No. 32TN6), the flame-retardant (when used) is added thereto and dispersed therein with a spatula. The surfactant is then added from a syringe and is also dispersed with a spatula. After inserting a baffle, a premixture of the amine catalyst and blowing agent is added but not dispersed. The container containing the aforesaid mixture is then placed in a drill press and the mixture agitated 15 seconds at 2000 revolutions per minute, after which the stannous octoate co-catalyst is added from a syringe. After mixing for an additional 8 seconds, the diisocyanate reactant is added rapidly and the agitation is continued for another 7 seconds. After the mixing cycle, the mixture is poured into a parchment-lined container (12 × 12 × 12 inches) supported by a wooden mold. The foam is allowed to rest in the container for at least 3 minutes and is then cured for 15 minutes at 130° C. After cutting, the height of the foam rise is measured, and foam samples are prepared for various physical property determinations including burning extent in the case of the flame-retarded foam products.

As used in the data which follows, the following terms have the indicated significance:

"Rise" denotes the foam height and is directly proportional to potency of the surfactant.

"Breathability" denotes foam porosity and is roughly proportional to the number of open cells in the foam. As reported herein, breathability was determined in accordance with the NOPCO test procedure described by R. E. Jones and G. Fesman, "Journal of Cellular Plastics" (January, 1965), as follows: A 2 inch × 2 inch × 1 inch piece of foam is cut from near the center of the bun. Using a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM).

EXAMPLES 9-10

In these examples Surfactants A and B produced in accordance with Examples 1 and 2 above, were employed as the "surfactant" component of flame-retarded Foam Formulation A at a concentration of one part by weight per 100 parts of polyol reactant. The results are given in Table III which also includes corresponding data as control Run No. 1 based on Surfactant AA which was also employed as the surfactant component of Foam Formulation A in a concentration of one part by weight.

TABLE III

| Ex. | Surf-act-ant | Rise (inches) | Breath-ability (SCFM) | Burning Extent (inches) | Burning Time (seconds) | Rating |
|---|---|---|---|---|---|---|
| 9 | A | 7.3 | 6.1 | 3 | 48 | SE |
| 10 | B | 7.1 | 6.0 | 2.4 | 40 | SE |
| Run K-1 | AA | 7.2 | 6.0 | 6 | 63 | B |

The results of Table III show that Surfactants A and B provided foam of substantially lower burning extent than control Surfactant AA which is otherwise an excellent stabilizer of polyether polyol-based urethane foam.

EXAMPLES 11-16

In these examples, Surfactant C prepared in accordance with Example 3 above was employed as the surfactant component of Foam Formulation A in a concentration of 0.3, 0.5 and 0.6 parts per 100 parts of polyol. Control foams were also prepared (Runs K-2 to K-4) based on above-identified Surfactant BB as the surfactant component of the same formulation at concentrations of 0.3 and 0.5 parts per 100 parts of polyol. The results of these examples and control runs are given in Table IV which follows.

TABLE IV

| Example | — | 11 | 12 | — | 13 | — | 14 | 15 | — | 16 |
|---|---|---|---|---|---|---|---|---|---|---|
| Control Run | K-2 | — | — | K-3 | — | K-4 | — | — | K-5 | — |
| Surfactant | BB[1] | C | C | BB[1] | C | BB[1] | C | C | BB[1] | C |
| Parts by weight | 0.3 | 0.3 | 0.6 | 0.5 | 0.5 | 0.3 | 0.3 | 0.6 | 0.3 | 0.3 |
| Rise, inches | 7.4 | 7.2 | 7.5 | 7.7 | 7.6 | 7.4 | 7.3 | 7.5 | 7.5 | 7.5 |
| Breathability, SCFM | 4.0 | 4.3 | 3.3 | 3.5 | 3.3 | 3.9 | 4.0 | 3.2 | 4.0 | 4.5 |
| Top Collapse, inches | None | None | None | None | None | None | None | None | None | None |
| CPI | 35–40 | 35–40 | 35–40 | 35–40 | 35–40 | 35–40 | 35–40 | 40–45 | 30–35 | 30–35 |
| Density, lbs./ft.$^3$ | 1.66 | 1.65 | 1.64[2] | 1.62 | 1.64 | 1.63 | 1.68 | 1.66[2] | 1.62 | 1.68 |
| Burning extent, inches | 3.6 | 2.4 | 2.7 | 3.9 | 2.2 | 3.9 | 2.6 | 2.6 | 3.6 | 2.5 |
| Burning time, seconds | 55 | 37 | 40 | 63 | 39 | 63 | 42 | 40 | 57 | 39 |

[1]Not a surfactant of the invention.
[2]Basal split.

"CPI" denotes "cells per inch", that is, the number of cells per linear inch of the foam. CPI is directly proportional to the fineness of the cell structure.

"Burning Extent" was determined in accordance with standard flammability test procedure ASTM D-1692-68 except that five test specimens of foam were used instead of ten. Burning extent denotes the burned length (in inches) of the foam and is reported as the average of the results obtained with the various test specimens of a given foam. On the basis of this test, an average burning extent of less than 5.0 inches qualifies the foam for a self-extinguishing ("SE") rating. When the burning extent of at least one test specimen is 5.0 inches or greater, the foam is assigned a burning ("B") rating and usually no further specimens of that foam are tested.

"Burning Time" denotes the average time (in seconds) taken to give the specified burning extent.

Comparison of the results of Example 11 with control K-2, Example 13 with control K-3, Example 14 with control K-4 and Example 16 with control K-5, shows that in each instance the foam product stabilized with 3-(2-cyanoethoxy)propyl-modified Surfactant C of the invention burned to a substantially lesser extent than the control foams stabilized with Surfactant BB in which the polysiloxane backbone is substituted with methyl groups only. The foam products of Examples 12 and 15 stabilized with 0.6 parts of surfactant C exhibited basal splits, but were also of relatively low burning extent and of otherwise acceptable quality.

EXAMPLES 17-20

In these examples, a series of foams were prepared employing Surfactants D and E of Examples 4 and 5 above, as the surfactant component of Foam Formulation A in the concentration given in Table V below. The control foam for this series was also the foam produced in Run K-4 which, for convenience, is repeated in Table V which follows.

TABLE V

| Example | — | 17 | 18 | 19 | 20 |
|---|---|---|---|---|---|
| Control Run | K-4 | — | — | — | — |
| Surfactant | BB[1] | D | E | D | E |
| Parts by weight | 0.3 | 0.3 | 0.3 | 0.6 | 0.6 |
| Rise, inches | 7.4 | 7.4 | 7.4 | 7.5 | 7.6 |
| Breathability, SCFM | 3.9 | 4.0 | 4.3 | 3.2 | 3.2 |
| Top collapse, inches | None | None | None | None | None |
| CPI | 35–40 | 25–30 | 35–40 | 35–40 | 40–45 |
| Density, lbs./ft.$^3$ | 1.63 | 1.68 | 1.66 | 1.66[2] | 1.64[2] |
| Burning extent, inches | 3.9 | 3.2 | 3.2 | 3.5 | 3.1 |
| Burning time, seconds | 63 | 56 | 52 | 59 | 51 |

[1]Not a surfactant of the invention.
[2]Basal split.

The results of Table V further demonstrate the efficacy of the surfacants of this invention in providing flame-retardant flexible polyether-based foam of relatively low burning extent.

EXAMPLES 21–22

In these examples, foams were prepared employing Surfactant F of Example 6 above, as the surfactant component of Foam Formulation A in a concentration of 1.0 and 0.5 part per 100 parts of polyol. As shown by the results of the following Table VI, the flame-retarded foam products were of low burning extent.

TABLE VI

| Example | 21 | 22 |
|---|---|---|
| Surfactant | F | F |
| Parts by Weight | 1.0 | 0.5 |
| Rise, inches | 7.6 | 7.4 |
| Breathability, SCFM | 4.0 | 4.4 |
| Top collapse, inches | None | None |
| CPI | 35–40 | 35–40 |
| Density, lbs./ft.$^3$ | 1.65 | 1.67 |
| Burning extent, inches | 2.6 | 2.4 |
| Burning time, seconds | 38 | 38 |

EXAMPLES 23–28

In accordance with these examples, another series of flame-retarded foams were provided employing above-described Surfactants G-1, G-2 and H as the surfactant component of Foam Formulation A. The control for this series was Run No. K-3. The level of surfactant employed in each foam preparation and the results are set-forth in Table VII which follows.

TABLE VII

| Example | — | 23 | 24 | 25 | 26 | 27 | 28 |
|---|---|---|---|---|---|---|---|
| Control Run | K-3 | — | — | — | — | — | — |
| Surfactant | BB[1] | G-1 | G-2 | H | G-1 | G-2 | H |
| Parts by weight | 0.5 | 0.5 | 0.5 | 0.5 | 1.0 | 1.0 | 1.0 |
| Rise, inches | 7.7 | 7.5 | 7.5 | 7.5 | 7.5 | 7.4 | 7.7 |
| Breathability, SCFM | 3.5 | 4.8 | 4.6 | 3.4 | 4.1 | 4.1 | 2.8 |
| Top collapse, inches | None | None | None | None | None | None | None |
| CPI | 35–40 | 35–40 | 35–40 | 35–40 | 35–40 | 30–35 | 35–40 |
| Density, lbs./ft.$^3$ | 1.62 | 1.64 | 1.68 | 1.64 | 1.62 | 1.64 | 1.63 |
| Burning extent, inches | 3.9 | 2.2 | 2.5 | 2.3 | 2.6 | 2.7 | 2.4 |
| Burning time, seconds | 63 | 36 | 42 | 39 | 41 | 48 | 36 |

[1]Not a surfactant of the invention.

Inspection of the data of Table VII indicates that the 3-(2-cyanoethoxy)propyl-modified copolymers of the invention provided flame-retarded foam of substantially lower burning extent than the foam stabilized with Surfactant BB in which the polysiloxane backbone is substituted solely with methyl groups.

EXAMPLES 29–37

In accordance with these examples, a potency determination was made of surfactants of this invention employing Foam Formulation B which had the following composition:

TABLE VIII

| FOAM FORMULATION B | |
|---|---|
| Component | Parts BY Weight |
| Polyether Polyol having a hydroxyl number of 46 produced by reacting glycerol, propylene oxide and ethylene oxide | 100 |
| Tolylene Diisocyanate (Index 105)[1] | 57 |
| Blowing Agent | |
| Water | 4.85 |
| Trichlorofluoromethane | 15 |
| Dimethylethanolamine | 0.35 |
| Stannous octoate | 0.3 |
| Surfactant | 0.6 |

[1]As identified in footnote[1] of Table II.

As indicated, Foam Formulation B contains 4.85 parts by weight of water per 100 parts by weight of polyol reactant. This system is usually more difficult to stabilize than the more conventional formulations containing less water and thus provides a relatively sensitive test of surfactant potency. Also included in this series of foam preparations was the preparation of control foams (Runs K-6 to K-10) employing above-described Surfactants BB and BB-1 as the surfactant component of Foam Formulation B. The results are given in Table IX which follows.

TABLE IX

| Potency Study | | | | |
|---|---|---|---|---|
| Control and Example | Surfactant | Rise (inches) | Breathability (SCFM) | Top Collapse (inches) |
| K-6 | BB[1] | 11.4 | 4.1 | 0.45 |
| K-7 | BB-1[2] | 11.8 | 2.1 | 0.1 |
| 29 | C | 11.3 | 3.5 | 0.4 |
| K-8 | BB-1[2] | 11.7 | 2.9 | 0.1 |
| 30 | C | 11.3 | 4.3 | 0.5 |
| 31 | D | 11.4 | 3.3 | 0.3 |
| 32 | E | 11.3 | 3.6 | 0.4 |
| K-9 | BB-1[2] | 11.6 | 3.3 | 0.1 |
| 33 | C | 11.3 | 5.5 | 0.4 |
| 34 | F | 10.3 | 7.5 | 1.5 |

TABLE IX-continued

Potency Study

| Control and Example | Surfactant | Rise (inches) | Breathability (SCFM) | Top Collapse (inches) |
|---|---|---|---|---|
| K-10 | BB-1[2] | 11.7 | 2.7 | Slight |
| 35 | G-1 | 10.4 | 6.2 | 1.4 |
| 36 | G-2 | 10.2 | 6.8 | 1.5 |
| 37 | H | 11.3 | 4.0 | 0.6 |

[1]Not a surfactant of the invention; employed in an amount of 0.6 part per 100 parts of polyol reactant contained in Foam Formulation B.
[2]Not a surfactant of the invention; employed as a 55 weight percent active solution as previously described; therefore, the active polymer concentration is also about 0.6 part per 100 parts of polyol reactant.

From the standpoint of foam rise the data of Table IX indicate that the potency of the surfactants of the invention is acceptable. The data also indicate that when used in non flame-retarded Foam Formulation B, overall the surfactants of the invention tend to provide more open foam (as reflected by the higher breathability values) than the comparative surfactants. In particular, the foams of Examples 34-36 were of a highly open, porous nature (breathability = 7.5, 6.2 and 6.8) which may have contributed to the observed top collapse (about 1.5 inches) of these particular foams. On the other hand, in the other examples of Table IX as well as the control runs, the foam products exhibted a minimum of top collapse, and, as shown by the data of Tables III–VII in which the surfactants of the invention were employed to stabilize flame-retarded foam, no settling of the original height of the foam was observed.

In accordance with the following Examples 38 and 39, further illustrative cyanoalkoxyalkyl-substituted polyalkylsiloxane-polyoxyalkylene copolymers of the invention, designated herein as Surfactants J and K, were prepared. These preparations comprised the platinum-catalyzed hydrosilation reaction between 3-(2-cyanoethoxypropyl)-substituted polymethylsiloxane hydrides, referred to respectively as Si—H Fluids VII and VIII, and a methoxy-capped, allyl alcohol-started poly(oxyethylene-oxypropylene) ether (referred to as Polyether C) having the average composition, $$CH_2=CHCH_2(OC_2H_4)_{24.9}(OC_3H_6)_{25.6}OMe.$$

The said Si—H reactants were prepared by the equilibration of reaction mixtures containing the following reactants as the source of the indicated units:

Reactant (1): Hexamethyldisiloxane, $Me_3SiOSiMe_3$, as the source of the endblocking trimethylsiloxy units, $Me_3SiO_{1/2}$.

Reactant (2): Cyclic polymers of dimethylsiloxane distilled to provide the cyclic tetramer, $[Me_2SiO]_4$, as a source of the dimethylsiloxy units.

Reactant (3): 3-(2-cyanoethoxy)propylheptamethylcyclotetrasiloxane,

$[(NC-C_2H_4O-C_3H_6)(Me)SiO][(Me)_2SiO]_3$ as the source of the 3-(2-cyanoethoxy)propyl methylsiloxy units and as an additional source of the dimethylsiloxy units. Illustrative of the manner in which this reactant was prepared is as follows: The cyclic tetramer, $[(Me)_2SiO]_3[(Me)(H)SiO]$, in an amount of 250 grams was heated to 60° C. followed by the addition thereto of 0.3 ml. of platinum catalyst solution prepared by the reaction of chloroplatinic acid with octyl alcohol. Further heating to 90° C. was followed by the addition of 97.3 grams of allyl 2-cyanoethyl ether over a period of 15 minutes. The reaction temperature maintained itself at about 100°-127° C. The reaction mixture was treated with sodium bicarbonate, filter aid and charcoal, and was then filtered and vacuum distilled (vacuum stripping is also suitable) to provide the corresponding 3-(2-cyanoethoxy)propyl-modified cyclic tetramer having a boiling point of 110°-112° C. at 3.0 mm. mercury pressure.

Reactant (4): Polymeric methylhydrogensiloxane, as the source of the $Me(H)SiO_{2/2}$ units.

The details of the respective preparations of Si—H Fluids VII and VIII are given hereinbelow.

Preparation of Si—H Fluid VII

A reaction mixture was prepared containing the aforesaid Reactants (1)-(4) in the following amounts:

Reactant (1): 1.14 grams, corresponding to 0.014 mole of the unit, $Me_3SiO_{1/2}$;

Reactant (2): 15.54 grams, corresponding to 0.21 mole of the unit, $Me_2SiO_{2/2}$;

Reactant (3): 27.6 grams, corresponding to 0.21 mole of the unit, $Me_2SiO_{2/2}$, and 0.07 mole of the unit, $(NC-C_2H_4O-C_3H_6)(Me)SiO_{2/2}$; and Reactant (4): 2.52 grams, corresponding to 0.042 mole of the unit, $Me(H)SiO_{2/2}$.

Also added was concentrated (98 percent) sulfuric acid in a total amount of about 1.5 grams. The reaction mixture was stirred at room temperature for about 22 hours. The equilibrated reaction product was neutralized with excess sodium bicarbonate, treated with filter aid (Hyflo Super-Cel) and charcoal (Darco G-60), followed by pressure filtration and vacuum stripping of toluene which had been added during filtration. The residual liquid product (32.7 grams) had a Brookfield viscosity of 270 centipoise and an average molecular weight of 8600 as determined by Gel Permeation Chromatrography (G.P.C.). Upon analysis for Si—H content, the product provided 20.2 cc. $H_2$/gram. Based upon the proportions of reactants employed, normalized to two moles of $Me_3SiO_{1/2}$ endblocking units, the average composition of the equilibrated liquid product is expressed as follows,

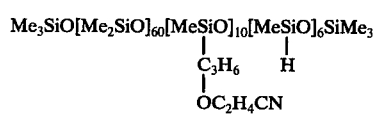

$$Me_3SiO[Me_2SiO]_{60}[MeSiO]_{10}[MeSiO]_6SiMe_3$$
with $C_3H_6$ and $H$ substituents, and $OC_2H_4CN$ This product is referred to herein as Si—H Fluid VII.

Preparation of Si—H Fluid VIII

A reaction mixture was prepared containing the aforesaid Reactants (1)-(4) in the following amounts:

Reactant (1): 0.8 grams, corresponding to about 0.01 mole of the unit, $Me_3SiO_{1/2}$;

Reactant (2): 10.4 grams, corresponding to 0.14 mole of the unit, $Me_2SiO_{2/2}$;

Reactant (3): 27.6 grams, corresponding to 0.21 mole of the unit, $Me_2SiO_{2/2}$, and 0.07 mole of the unit, $(NC-C_2H_4O-C_3H_6)(Me)SiO_{2/2}$; and Reactant (4): 2.3 grams, corresponding to about 0.04 mole of the unit, $Me(H)SiO_{2/2}$.

The reaction mixture was stirred at room temperature for about 22 hours in the presence of about 1.5 grams of concentrated sulfuric aicd. The equilibrated product was then neutralized with excess sodium bicarbonate, treated with filter aid and charcoal, followed by pressure filtration and vacuum stripping of toluene which had been added during filtration. The residual liquid product (23.6 grams) had a Brookfield viscosity of 400 centipoise and an average molecular weight of 11,000 (G.P.C.). Upon analysis for Si—H content, the product provided 21.3 cc. $H_2$/gram. Based upon the proportions of reactants employed, normalized to two moles of $Me_3SiO_{1/2}$ endblocking units, the average composition of the equilibrated liquid product is as follows,

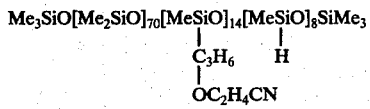

This product is referred to herein as Si—H Fluid VIII.

EXAMPLE 38

PREPARATION OF SURFACTANT J

In a 250 ml. reaction vessel fitted with a mechanical stirrer, thermometer, condenser and nitrogen blow-by, there were combined 20 grams of above-described Si—H Fluid VII, 67.3 grams of Polyether C and 40 grams of toulene. After heating the reaction mixture to 84° C., there was then added 0.3 ml. of platinum catalyst prepared by the reaction of chloroplatinic acid and octyl alcohol. After about 15 minutes of heating at 84°–86° C., residual Si—H was less than 0.1 cc. $H_2$ per 0.5 ml. sample. The reaction product was cooled, treated with sodium bicarbonate, filter aid and charcoal, and was then pressure filtered and vacuum stripped. The liquid reaction product designated herein as Surfactant J, had a viscosity of 2100 centipoise, and average molecular weight of 25,000 (G.P.C.), and is assigned the following average composition,

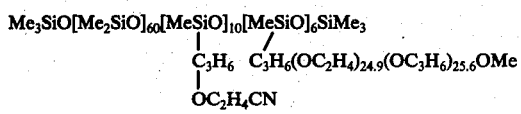

EXAMPLE 39

PREPARATION OF SURFACTANT K

The copolymer of this example was prepared and worked-up substantially as described under Example 38 employing 15 grams of Si—H Fluid VIII and 53.5 grams of Polyether C in 40 grams of toluene. The liquid reaction product which is referred to herein as Surfactant K, had a viscosity of 2300 centipoise, an average molecular weight of 33,000 (G.P.C.), and is assigned the following average composition,

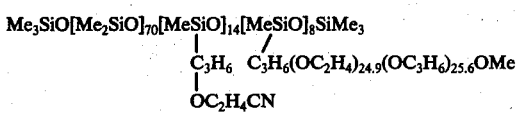

EXAMPLES 40-41

In accordance with these examples, flame-retarded, flexible polyether polyol urethane foams were prepared employing Surfactants J and K as the respective foam stabilizers. In addition to the surfactant, the other components of the foam-producing reaction mixture (Foam Formulation C) were as identified in the following Table X.

TABLE X

FOAM FORMULATION C

| Components | Parts By Weight |
|---|---|
| Polyether Polyol having a Hydroxyl Number of about 46 produced by reacting glycerol, propylene oxide and ethylene oxide. | 100 |
| Tolylene Diisocyanate (Index 105)[1] | 48.4 |
| Water | 4 |
| Bis[2-(N,N-dimethylamino)ethyl] ether employed as a 70 weight percent solution in dipropylene glycol | 0.1 |
| Stannous Octoate | 0.25 |
| Tris(2,3-dichloropropyl)phosphate | 12.5 |
| Surfactant | 0.6 |

[1]As identified in footnote [1] of Table II

In these foam preparations, the above-described general foaming procedure was followed. The results are given in the following Table XI.

TABLE XI

| Example | 40 | 41 |
|---|---|---|
| Surfactant | J | K |
| Rise, inches | 7.0 | 7.0 |
| Breathability, SCFM | 3.4 | 2.6 |
| Burning extent, inches | 2.0 | 1.8 |
| Burning time, seconds | 41.1 | 38.3 |

EXAMPLES 42–43

In accordance with these examples, a potency determination was made of Surfactants J and K. In addition to the surfactant, the other components of the foam-producing reaction mixture (Foam Formulation D) were as identified in the following Table XII.

TABLE XII

FOAM FORMULATION D

| Component | Parts By Weight |
|---|---|
| Polyether Polyol having a Hydroxyl No. of about 46, produced from glycerol, propylene glycol, propylene oxide and ethylene oxide. | 100 |
| Tolylene Diisocyanate[1] | 57 |
| Blowing Agent | |
| Water | 4.85 |
| Trichlorofluoromethane | 15.0 |
| Dimethylethanolamine | 0.35 |
| Stannous octoate | 0.3 |
| Surfactant | 0.6 |

[1]As defined in footnote [1] of Table II.

As a control foam (Run K-11), above-identified Surfactant BB was employed as the surfactant component of Foam Formulation D at a concentration of 0.6 part per 100 parts of the polyether polyol reactant. The results of these foam preparations are given in Table XIII which follows.

TABLE XIII

| Example | — | 42 | 43 |
|---|---|---|---|
| Control | K-11 | — | — |
| Surfactant | BB | J | K |
| Rise, inches | 11.5 | 11.7 | 11.6 |
| Breathability, SCFM | 5.0 | 5.3 | 3.7 |

The results of Tables XI and XIII further illustrate the effectiveness of the copolymes of this invention as stabilizers of both flame-retarded and non flame-retarded flexible polyether polyol urethane foam.

1. A process for producing flexible polyurethane foam which comprises simultaneously reacting and foaming a reaction mixture containing: (a) a polyether polyol reactant containing an average of at least two hydroxyl groups per molecule; (b) a polyisocyanate reactant containing at least two isocyanato groups per molecule; (c) a blowing agent; (d) a catalyst comprising an amine; and (e) a foam stabilizer comprising polysiloxane-polyoxyalkylene copolymers having the average composition,

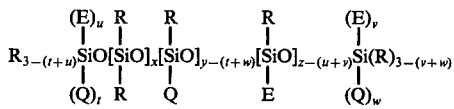

wherein: R is alkyl having from 1 to 10 carbon atoms; Q is a cyano-bearing ether group having the formula, $-(O)_q R'OR''CN$, where $q$ is zero or one, $R'$ is bivalent alkylene of 3 to 8 carbon atoms and $R''$ is bivalent alkylene of 2 to 4 carbon atoms; E is a polyoxyalkylene block having the formula, $-(R°)_p-(O C_aH_{2a})_b-OG$, where $R°$ comprises a bivalent alkylene group a carbon atom of which is bonded to silicon, G comprises a monovalent hydrocarbon group having from 1 to 12 carbon atoms, $p$ is zero or one, $a$ has a value from 2 to 4 provided from about 20 to about 65 weight percent of the polyoxyalkylene chain, $-(OC_aH_{2a})_b-$, is constituted of oxyethylene units, and $b$ has an average value such that the average molecular weight of the chain is from about 1000 to about 6000; each of $t$, $u$, $v$ and $w$ is independently zero or one provided each of the sums $t+u$ and $v+w$ is independently zero or one; each of the sums $t+w$ and $u+v$ is independently zero, one or two; $x$ has an average value from about 10 to about 200; $y$ has an average value from about 2 to about 100; and $z$ has an average value from about 2 to about 30.

2. A process as defined in claim 1 in which said reaction mixture contains a flame-retardant as an additional component thereof.

3. A process which comprises simultaneously reacting and foaming a reaction mixture containing: (a) a polyether polyol reactant containing an average of at least two hydroxyl groups per molecule; (b) an organic polyisocyanate reactant containing at least two isocyanato groups per molecule; (c) water as a source of blowing action; (d) a catalyst comprising a tertiary-amine; (e) a flame-retarding agent; and (f) a foam stabilizer comprising siloxane-polyoxyalkylene copolymers having the average composition,

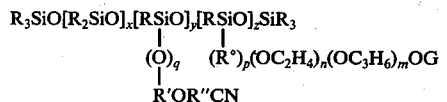

wherein: R is alkyl having from one to four carbon atoms; R' is bivalent alkylene of 2 to 6 carbon atoms; R" is bivalent alkylene of 2 to 4 carbon atoms; R° comprises a bivalent alkylene group of from 2 to 6 carbon atoms a carbon atom of which is bonded to silicon; G comprises a monovalent hydrocarbon group having from 1 to 12 carbon atoms; $q$ is zero or one; $p$ is zero or one; $x$ has an average value from about 10 to about 200, $y$ has an average value from about 2 to about 100, and $z$ has an average value from about 2 to about 30, provided an average of from about 55 to about 85 weight percent of said copolymers is constituted of said $-(R°)_p(OC_2H_4)_n(OC_3H_6)_mOG$ blocks; and $m$ and $n$ are numbers such that the average molecular weight of the chain, $-(OC_2H_4)_n(OC_3H_6)_m-$, is from about 1000 to about 6000 and from about 20 to about 65 weight percent of the chain is constituted of oxyethylene.

4. A process for producing flexible polyurethane foam which comprises simultaneously reacting and foaming a reaction mixture containing: (a) a polyether polyol reactant containing an average of at least two hydroxyl groups per molecule; (b) an organic polyisocyanate reactant containing at least two isocyanato groups per molecule; (c) water as a source of blowing action; (d) a catalyst comprising a tertiary-amine; (e) a flame-retarding agent; and (f) a foam stabilizer comprising siloxane-polyoxyalkylene copolymers having the average composition,

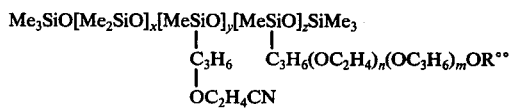

wherein: Me is methyl; R°° is a monovalent hydrocarbon group having from 1 to 12 carbon atoms; $x$ has an average value from about 20 to about 100, $y$ has an average value from about 3 to about 30, and $z$ has an average value from about 2 to about 10, provided the average weight of said copolymers attributable to said $-C_3H_6(OC_2H_4)_n(OC_3H_6)_mOR°°$ groupings is from about 55 to about 85 weight percent; and $m$ and $n$ are numbers such that the average molecular weight of the chain, $-(OC_2H_4)_n(OC_3H_6)_m-$, is from about 1000 to about 6000 and from about 20 to about 65 weight percent of said chain is constituted of oxyethylene.

5. A process as defined in claim 4 in which R°° of said copolymers is methyl.

* * * * *

UNITED STATES PATENT OFFICE
CERTIFICATE OF CORRECTION

Patent No. 4,058,494     Dated November 15, 1977

Inventor(s) Bela Prokai and Bernard Kanner

It is certified that error appears in the above-identified patent and that said Letters Patent are hereby corrected as shown below:

Column 2, line 35, before "by" insert the parenthesis mark -- ( --; line 62, for "cyanolkyl" read -- cyanoalkyl --. Column 3, line 24, the formula reading $$NC-R''O-R''-$$ should read $$NC-R''O-R'-$$

Column 6, line 52, for "R' " read -- R" --; line 53, that portion of the formula reading $$NC-R'\lambda$$ should read $$NC-R'-$$

Column 8, line 9, for "lox" read -- loxy --. Column 10, line 36, for "Z" read $\underline{z}$ --. Column 17, line 28, for "reactanrts" read -- reactants --. Column 18, line 37, for "Formfula" read -- Formula --. Column 19, line 10, for "yanlkylsubstituted" read -- yalkyl-substituted --; line 11, for "Formfula" read -- Formula --. Column 20, line 32, for "spcific" read -- specific --; line 36, for "monoelefinic" read -- monoolefinic --. Column 21, line 31, for "cyanoalkoxyalcosy" read -- cyanoalkoxyalkoxy --. Column 23, line 62, for "he" read -- the --. Column 24, line 18, for "Poly(oxyethylene-" read -- poly(oxyethylene- --. Column 25, line 2, for "triethyl-" read -- trimethyl --. Column 27, line 68, for "moe" read -- more --. Column 30, line 36, for "availabe" read -- available --; line 45, for "aforesiad" read -- aforesaid --; line 58, for "d." read -- g. --; line 66, for "flammbility" read -- flammability --. Column 31, line 13, for "amount" read -- amounts --; line 22, for "cataylst" read -- catalyst --; line 48, after "paddings" insert -- , --. Column 32, line 29, for "$\underline{x}$" read -- $\underline{y}$ --; line 35, for "oxythylene" read -- oxyethylene --; line 38, for "polyester" read -- polyether --; line 59, for "witn" read -- with --. Column 33, line 13, for

UNITED STATES PATENT OFFICE
CERTIFICATE OF CORRECTION

Patent No. 4,058,494                    Dated November 15, 1977

Inventor(s) Bela Prokai and Bernard Kanner

It is certified that error appears in the above-identified patent and that said Letters Patent are hereby corrected as shown below:

"(2)" read -- (1) --; line 13, for "normalised" read -- normalized --. Column 38, lines 1-5, that portion of the formula reading $$O]_{13.6}Me \quad \text{should read} \quad O]_{13.6}[Me$$

Column 38, line 13, for "corresponding" read -- correspondingly --. Column 42, line 41, for "undiluated" read -- undiluted --. Column 45, line 19, for "surfacants" read -- surfactants --; line 20, for "flame-retardant" read -- flame-retarded --. Column 47, line 26, for "exhibted" read -- exhibited --; line 47, that portion of the formula reading    SI   should read    Si
Column 48, line 35, for "Chromatrogra-" read -- Chromatogra- --; line 64, for "aicd" read -- acid --.
Column 49, line 23, for "toulene" read -- toluene --.
Column 50, line 62, for "copolymes" read -- copolymers --; between lines 64 and 65, read -- WHAT IS CLAIMED IS: --.
Column 51, line 17, after "one," for "R" " read -- R' --.

Signed and Sealed this

Thirteenth Day of June 1978

[SEAL]

Attest:

RUTH C. MASON
Attesting Officer

DONALD W. BANNER
Commissioner of Patents and Trademarks